US009403094B2

(12) United States Patent
Nogami et al.

(10) Patent No.: US 9,403,094 B2
(45) Date of Patent: Aug. 2, 2016

(54) INFORMATION PROCESSING SYSTEM, GAME SYSTEM, INFORMATION PROCESSING DEVICE, TERMINAL DEVICE, INFORMATION PROCESSING METHOD, AND STORAGE MEDIUM HAVING INFORMATION PROCESSING PROGRAM STORED THEREIN

(71) Applicant: Nintendo Co., Ltd., Kyoto (JP)

(72) Inventors: Hisashi Nogami, Kyoto (JP); Munetaka Tsuda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/840,735

(22) Filed: Aug. 31, 2015

(65) Prior Publication Data

US 2015/0367235 A1 Dec. 24, 2015

Related U.S. Application Data

(63) Continuation of application No. 13/418,540, filed on Mar. 13, 2012, now Pat. No. 9,180,368.

(30) Foreign Application Priority Data

Jun. 3, 2011 (JP) .................................. 2011-125738
Jun. 3, 2011 (JP) .................................. 2011-125739

(51) Int. Cl.
*A63F 13/00* (2014.01)
*A63F 13/31* (2014.01)
(Continued)

(52) U.S. Cl.
CPC ................ *A63F 13/31* (2014.09); *A63F 13/06* (2013.01); *A63F 13/08* (2013.01); *A63F 13/25* (2014.09);
(Continued)

(58) Field of Classification Search
CPC ................... A63F 2300/105; A63F 2300/301; H04N 21/4312; H04N 21/47214; H04N 21/4821

USPC ................................................ 463/31, 40–42
See application file for complete search history.

(56) References Cited

U.S. PATENT DOCUMENTS 8,529,352 B2 9/2013 Mae et al.
2008/0007570 A1 1/2008 Wessel et al.
(Continued)

FOREIGN PATENT DOCUMENTS

JP 2010-157820 7/2008
JP 2009-200553 9/2009

OTHER PUBLICATIONS

Office Action in parent U.S. Appl. No. 13/418,540 mailed Jan. 22, 2013.
(Continued)

*Primary Examiner* — Masud Ahmed
(74) *Attorney, Agent, or Firm* — Nixon & Vanderhye, P.C.

(57) ABSTRACT

An example game system includes a game apparatus and an operating device. The game apparatus acquires operation data from the operating device. Moreover, the game apparatus executes an application and outputs an image generated by the execution of the application to either the operating device or a predetermined display device different from the operating device, or both. When a predetermined operation is performed on the operating device during the execution of the application, a predetermined operation image is displayed on a display unit of the operating device. In a state where the operation image is displayed on the display unit, the game apparatus determines whether or not a control instruction has been provided to control the predetermined display device, on the basis of the operation data. When the control instruction is determined to have been provided, the predetermined display device is controlled in accordance with the control instruction.

27 Claims, 19 Drawing Sheets

(51) Int. Cl.
*A63F 13/90* (2014.01)
*A63F 13/20* (2014.01)
*A63F 13/25* (2014.01)

(52) U.S. Cl.
CPC ... *A63F 2300/1075* (2013.01); *A63F 2300/209* (2013.01); *A63F 2300/301* (2013.01); *A63F 2300/302* (2013.01); *A63F 2300/308* (2013.01)

(56) References Cited

U.S. PATENT DOCUMENTS

| | | |
|---|---|---|
| 2008/0168387 A1 | 7/2008 | Brownrigg et al. |
| 2009/0061841 A1 | 3/2009 | Chaudhri et al. |
| 2009/0208191 A1 | 8/2009 | Imai et al. |
| 2009/0234811 A1 | 9/2009 | Jamil et al. |
| 2010/0262938 A1 | 10/2010 | Woods et al. |
| 2010/0306773 A1 | 12/2010 | Lee et al. |
| 2011/0154402 A1 | 6/2011 | Sinha et al. |
| 2012/0322558 A1 | 12/2012 | Tiley et al. |

OTHER PUBLICATIONS

Office Action in parent U.S. Appl. No. 13/418,540 mailed Jun. 27, 2013.
Notice of Allowance in parent U.S. Appl. No. 13/418,540 mailed Aug. 27, 2015.
"Enjoy More! PS3&PSP", Aspect Co., Ltd., Jun. 9, 2008, p. 22 with translation.
"Torne Ver 1.0," Sony Computer Entertainment Inc., 2010, pp. 26-29 with translation.
Office Action of Aug. 31, 2015 issued in corresponding Japanese Patent Application No. 2011-125738.
"Enjoy More! PS3&PSP", Aspect Co., Ltd., Jun. 9, 2008, p. 23-25 partial translation.
Office Action in Japanese Application No. JP2011-1257387 dated May 16, 2016.

INFORMATION PROCESSING SYSTEM, GAME SYSTEM, INFORMATION PROCESSING DEVICE, TERMINAL DEVICE, INFORMATION PROCESSING METHOD, AND STORAGE MEDIUM HAVING INFORMATION PROCESSING PROGRAM STORED THEREIN

CROSS REFERENCE TO RELATED APPLICATION

This is a continuation of U.S. patent application Ser. No. 13/418,540 filed on Mar. 13, 2012, the disclosure of which is herein incorporated by reference in its entirety. The disclosure of Japanese Patent Application Nos. 2011-125738 and 2011-125739, filed Jun. 3, 2011, is incorporated herein by reference.

FIELD

Disclosed herein are game systems, information processing methods, game apparatuses, and storage media having information processing programs stored therein, which are intended to use display devices such as televisions.

BACKGROUND AND SUMMARY

Conventionally, some game systems use televisions as display devices, and conceivably execute various applications in addition to games. For example, in such a conventional game system, a game apparatus might execute, in addition to a game program, an application for displaying a television program guide on the television. In this manner, game systems can be intended for game use and also for various other uses.

Here, the television, which is also used as a display device in the game system, is intended for purposes of displaying images from the game system (e.g., game images and images for the program guide), and also for purposes other than in the game system (e.g., displaying television broadcast video). Moreover, in the case where the game system can be used for various purposes as described above, the frequency of use of the game system itself increases, and therefore, it is quite conceivable that the user uses the game system (e.g., to view the program guide) while watching the television. However, the conventional art as mentioned above has a problem with user-friendliness in switching between a state where the television is used in the game system and another state where the television is used for a purpose other than in the game system.

Therefore, the game systems, information processing methods, game apparatuses, and storage media having information processing programs stored therein as disclosed herein allow a display device, such as a television, to be readily operated during the execution of an application.

(1) An example game system described herein includes a game apparatus and an operating device.

The operating device includes an operation unit, a reception unit, and a display unit. The operation unit outputs operation data representing an operation on the operating device. The reception unit receives an image outputted by the game apparatus. The display unit displays the received image.

The game apparatus includes an acquisition unit, an application execution unit, an operation image generation unit, an instruction determination unit, and a device control unit. The acquisition unit acquires the operation data. The application execution unit executes an application and outputs an image generated by the execution of the application to either the operating device or a predetermined display device different from the operating device, or both. When a predetermined operation is performed on the operating device during the execution of the application, the operation image generation unit generates and outputs a predetermined operation image to the operating device. The instruction determination unit makes a determination in a state where the operation image is displayed on the display unit, on the basis of the operation data, the determination being as to whether or not a control instruction has been provided to control the predetermined display device. When the control instruction is determined to have been provided, the device control unit controls the predetermined display device in accordance with the control instruction.

According to the above configuration (1), when a predetermined operation is performed on an operating device during the execution of an application, an operation image is displayed on the screen of the operating device. Thereafter, in the state where the operation image is displayed, when an instruction to control a predetermined display device is provided, the predetermined display device is controlled in accordance with the control instruction. Thus, the above configuration (1) allows the predetermined display device to be operated while using an application in the game system, without terminating the execution of the application. Moreover, the user can both perform the predetermined operation and provide the control instruction simply by using one operating device, so that the display device can be readily operated even during the execution of the application. For example, by using the operating device, the user can readily perform operations for watching a television program during the execution of the application, and thereafter, resuming the application.

Note that the game apparatus may include a first image generation unit for generating and outputting an application selection image to the operating device. The application selection image includes images representing applications executable by the game apparatus. In this case, when an application to be executed is selected with the application selection image being displayed, the application execution unit executes the selected application.

(2) In the state where the operation image is displayed on the display unit, the instruction determination unit may determine whether or not a termination instruction has been provided to terminate the application being executed, on the basis of the operation data. In this case, when the termination instruction is determined to have been provided, the application execution unit terminates the execution of the application.

According to the above configuration (2), when the termination instruction is provided with the operation image being displayed, an application being executed is terminated. Thus, when the operation image is displayed, the user can both operate the display device and perform an operation to terminate the application.

(3) When a predetermined operation is performed on the operating device during the execution of the application, the application execution unit may suspend the execution of the application. In this case, with the operation image being displayed on the display unit, the instruction determination unit determines whether or not a resumption instruction has been provided to resume the execution of the application, on the basis of the operation data. When the resumption instruction is determined to have been provided, the application execution unit resumes the execution of the application.

According to the above configuration (3), when the resumption instruction is provided with the operation image being displayed, the execution of an application is resumed.

Accordingly, with the operation image being displayed, the user can operate the display device, and thereafter, readily resume the application. Thus, for example, by using the operating device, the user can readily perform a series of operations of watching the television while using the application, and thereafter, resuming the use of the application.

(4) The predetermined display device may be capable of receiving television broadcasting and displaying a television program. In this case, when the operation image is displayed on the display unit, the operation image generation unit generates an image including a program guide and outputs the generated image to the predetermined display device.

According to the above configuration (4), when the operation image is displayed on the operating device, a television program guide is displayed on the predetermined display device. Thus, the user can operate the television (the predetermined display device) while viewing the program guide, which facilitates the operation of, for example, selecting the channel of the television.

(5) The operation image generation unit may generate as the operation image an image including a control instruction image representing the control instruction. In this case, when the control instruction image is selected, the instruction determination unit determines the control instruction to have been provided.

According to the above configuration (5), the operating device displays a control instruction image representing the control instruction as the operation image. Thus, the user can more readily provide the control instruction.

(6) The predetermined display device may be capable of receiving television broadcasting and displaying a television program. In this case, the operation image generation unit generates an image including a program guide as the operation image, and outputs the generated image to the operating device.

According to the above configuration (6), the operating device displays a program guide as the operation image. Thus, the user can operate the television (the predetermined display device) while viewing the program guide, which facilitates the operation of, for example, selecting the channel of the television.

(7) The predetermined display device may be switchable between a first mode where an image inputted from the game apparatus is displayed and a second mode where a television broadcast image is displayed. In this case, the device control unit controls the predetermined display device to be switched to the second mode in response to the operating device displaying the operation image.

According to the above configuration (7), when switching display to the operation image, the user does not perform any input switching operation on the predetermined display device, resulting in more simplified user operations.

(8) The predetermined display device may be switchable between a first mode where an image inputted from the game apparatus is displayed and a second mode where a television broadcast image is displayed. The device control unit controls the predetermined display device to be switched to the first mode in response to the operation image displayed on the operating device switching to an image generated by the execution of the application.

According to the above configuration (8), when switching display from the operation image to an image for an application, the user does not perform any input switching operation on the predetermined display device, resulting in more simplified user operations.

(9) The operating device may further include a control signal output unit for outputting a control signal to control the predetermined display device. In this case, the device control unit instructs the operating device to cause the control signal output unit to transmit a control signal indicating the content of control according to the control instruction.

The above configuration (9) makes it possible to readily control the predetermined display device from the game apparatus via the operating device.

(10) The control signal output unit may output an infrared signal as the control signal. In this case, the predetermined display device includes an infrared light reception unit capable of receiving the infrared signal.

The above configuration (10) allows the operating device to control the predetermined display device by the infrared signal. Note that general televisions (such as a television 2 in the example embodiment to be described later) have the function of receiving an infrared signal and perform an operation specified by the infrared signal. Thus, according to the above configuration (10), a television can be used as the predetermined display device, so that a highly versatile game system can be provided.

(11) The device control unit may output a control signal to the predetermined display device, the signal indicating the content of control according to the control instruction.

The above configuration (11) allows the information processing apparatus to readily control the predetermined display device by transmitting a control command. According to the above configuration (11), for example, a television which supports the HDMI standard can be used as the predetermined display device, so that a highly versatile game system can be provided.

(12) The operating device may further include a touch panel provided on a screen of the display unit. In this case, the operation image generation unit generates as the operation image an image including a control instruction image representing the control instruction. When the control instruction image is selected on the touch panel, the instruction determination unit determines the control instruction to have been provided.

The above configuration (12) allows the user to provide the control instruction using the touch panel. Thus, the user can provide instructions by easy and intuitive operations using the touch panel.

Note that disclosed herein is an example of the game apparatus included in the game system as described in (1) to (12) above. Also disclosed herein is an example non-transitory storage medium having stored therein a game program (an information processing program) for causing a computer of the game apparatus to function as means equivalent to the aforementioned units of the game apparatus (excluding the acquisition unit and the operation image output unit). Also disclosed herein is an example game processing method to be executed in the game system or apparatus as described in (1) to (12) above.

In the game system, information processing method, game apparatus, storage medium having an information processing program stored therein as mentioned above, an operation image is displayed on the screen of an operating device in response to a predetermined operation being performed on the operating device during the execution of an application, so that, with the operation image being displayed, a predetermined display device can be controlled in accordance with a control instruction. Thus, when using an application in the game system, the predetermined display device can be operated without terminating the execution of the application.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Overall Configuration of the Game System

Figure 1:
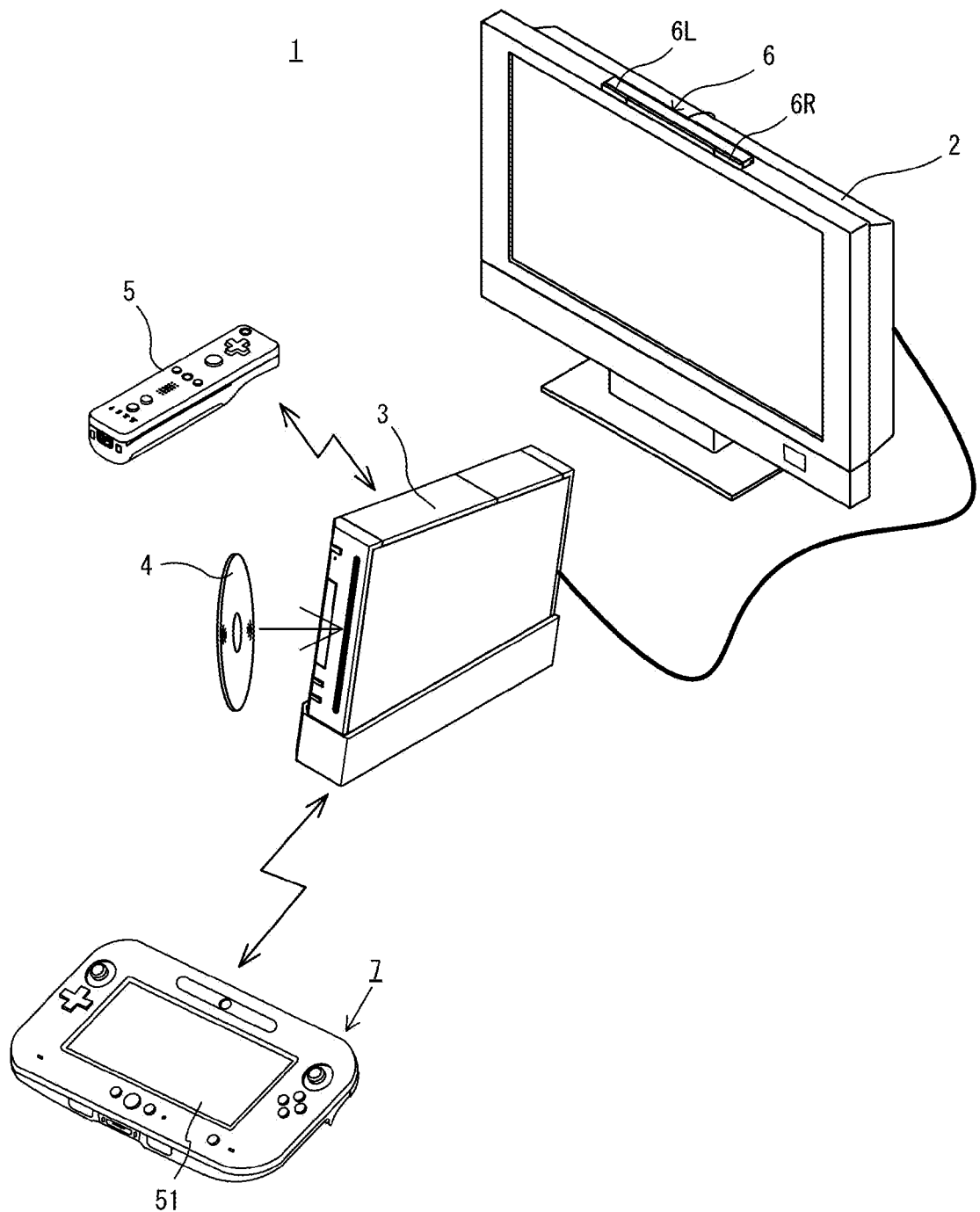
FIG. 1 is an external view of an example non-limiting game system.

An example game system 1 according to an example embodiment will now be described with reference to the drawings. FIG. 1 is an external view of the game system 1. In FIG. 1, the game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5 and the terminal device 7, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes speakers 2a (see FIG. 2), and the speakers 2a output game sounds acquired as a result of the game process. In alternative example embodiments, the game apparatus 3 and the stationary display device may be an integral section. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the movement, position, attitude, etc., of the controller 5. The marker device 6 includes two markers 6R and 6L on opposite ends thereof. Specifically, the marker 6R (as well as the marker 6L) includes one or more infrared light emitting diodes (LEDs), and emits an infrared light in a forward direction from the television 2. The marker device 6 is connected to the game apparatus 3 by wire (or wirelessly), and the game apparatus 3 is able to control the lighting of each infrared LED of the marker device 6. Note that the marker device 6 is of a portable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in FIG. 1, the game system 1 includes only one controller 5, but the game system 1 may include more than one controller 5. Specifically, the game apparatus 3 is capable of communicating with a plurality of controllers, so that by using a predetermined number of controllers at the same time, a plurality of people can play the game. The configuration of the controller 5 will be described in detail later.

The terminal device 7 is a portable device of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 74 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

2. Internal Configuration of the Game Apparatus 3

Figure 2:
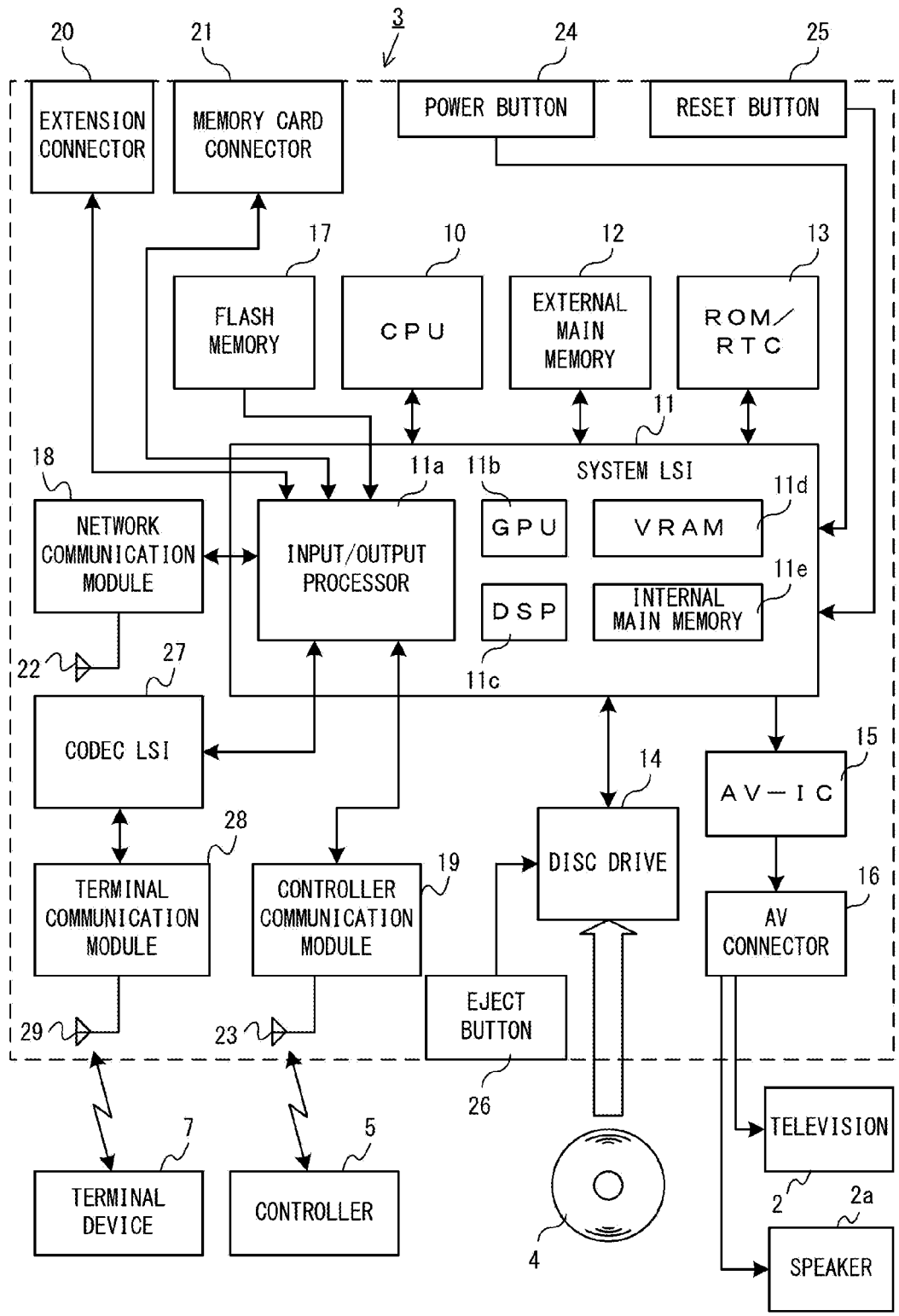
FIG. 2 is a block diagram illustrating an internal configuration of an example non-limiting game apparatus.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that in the present example embodiment, the game apparatus 3 generates both images (game images) to be displayed on the television 2 and images (game images) to be displayed on the terminal device 7. Hereinafter, the images to be displayed on the television 2 are referred to as the "television images" and the images to be displayed on the terminal device 7 are referred to as the "terminal images".

The DSP 11c, functioning as an audio processor, generates sound data using sound data and sound waveform (e.g., tone quality) data stored in one or both of the internal main memory 11e and the external main memory 12. Note that in the present example embodiment, sounds (game sounds) to be generated are classified into two types as in the case of the game images, one being outputted from the speaker of the television 2, the other being outputted from speakers of the terminal device 7. Hereinafter, in some cases, the sounds to be outputted from the television 2 are referred to as "television sounds", and the sounds to be outputted from the terminal device 7 are referred to as "terminal sounds".

Among the images and sounds generated by the game apparatus 3 as described above, both image data and sound data to be outputted from the television 2 are read out by the AV-IC 15. The AV-IC 15 outputs the read-out image data to the television 2 via an AV connector 16, and outputs the read-out sound data to the speakers 2a provided in the television 2. Thus, images are displayed on the television 2, and sounds are outputted from the speakers 2a. Note that the game apparatus 3 and the television 2 may be connected in any manner, and a control command for controlling the television 2 may be transmitted to the television 2 by the game apparatus 3 in a wired or wireless manner. For example, an HDMI cable, which supports the HDMI (high-definition multimedia interface) standard, may be used. The HDMI standard allows a device to control another device connected thereto on the basis of a function called CEC (consumer electronics control). Accordingly, in the case where the HDMI cable is used so that the game apparatus 3 can control the television 2, the game apparatus 3 can turn on the television 2 or switch between inputs to the television 2 at appropriate times.

Furthermore, among the images and sounds generated by the game apparatus 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with an external information processing apparatus (e.g., another game apparatus or a server). Specifically, the input/output processor 11a can be connected to a network such as the Internet via the network communication module 18 and the antenna 22 to communicate with other information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game apparatus 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, the game system avoids delay in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method uses a high compression rate but causes less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 11) or an instruction to control shooting by a camera (a camera 56 shown in FIG. 11). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game apparatus 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

3. Configuration of the Controller 5

Figure 3:
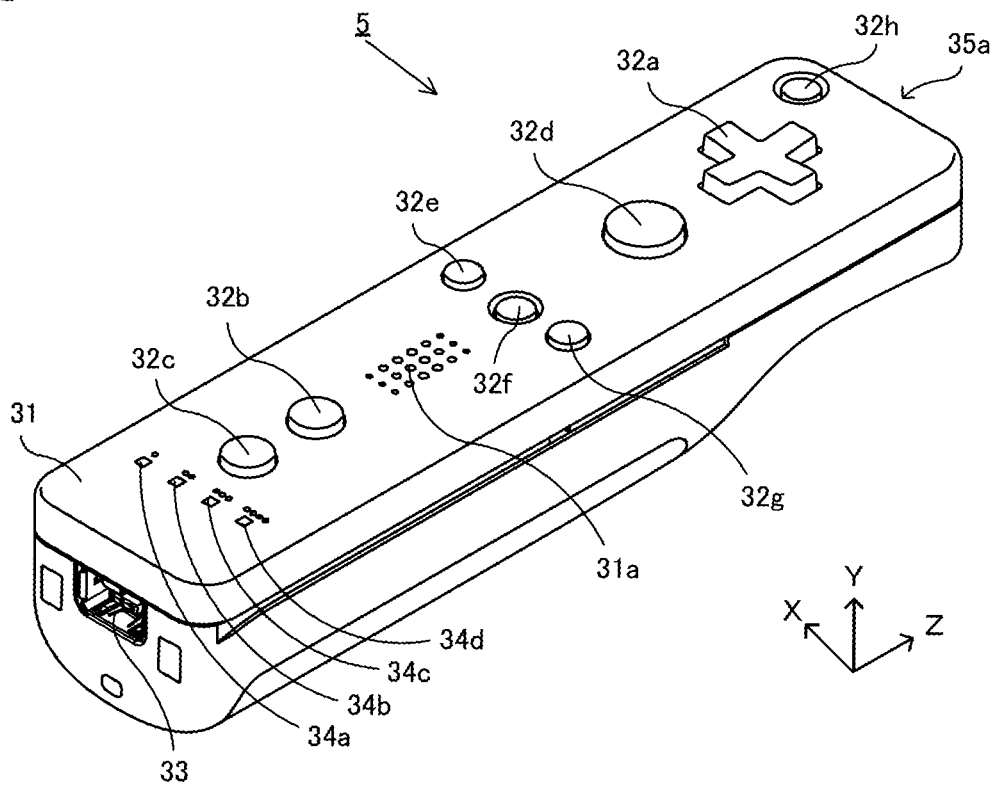
FIG. 3 is a perspective view illustrating an external configuration of an example non-limiting controller.
Figure 4:
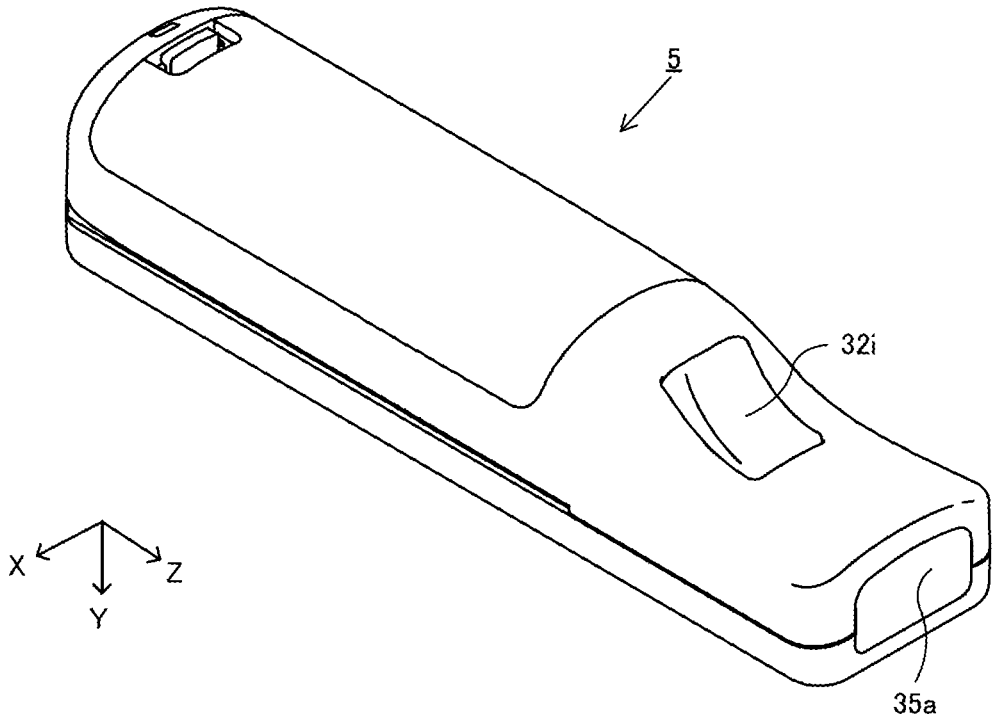
FIG. 4 is another perspective view illustrating the external configuration of the controller.

Next, with reference to FIGS. 3 to 7, the controller 5 will be described. FIGS. 3 and 4 are perspective views each illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the controller 5 to another device (e.g., another sensor section or controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 47 (shown in FIG. 5) incorporated in the controller 5 is provided between the first button 32b and the home button 32f.

Figure 5:
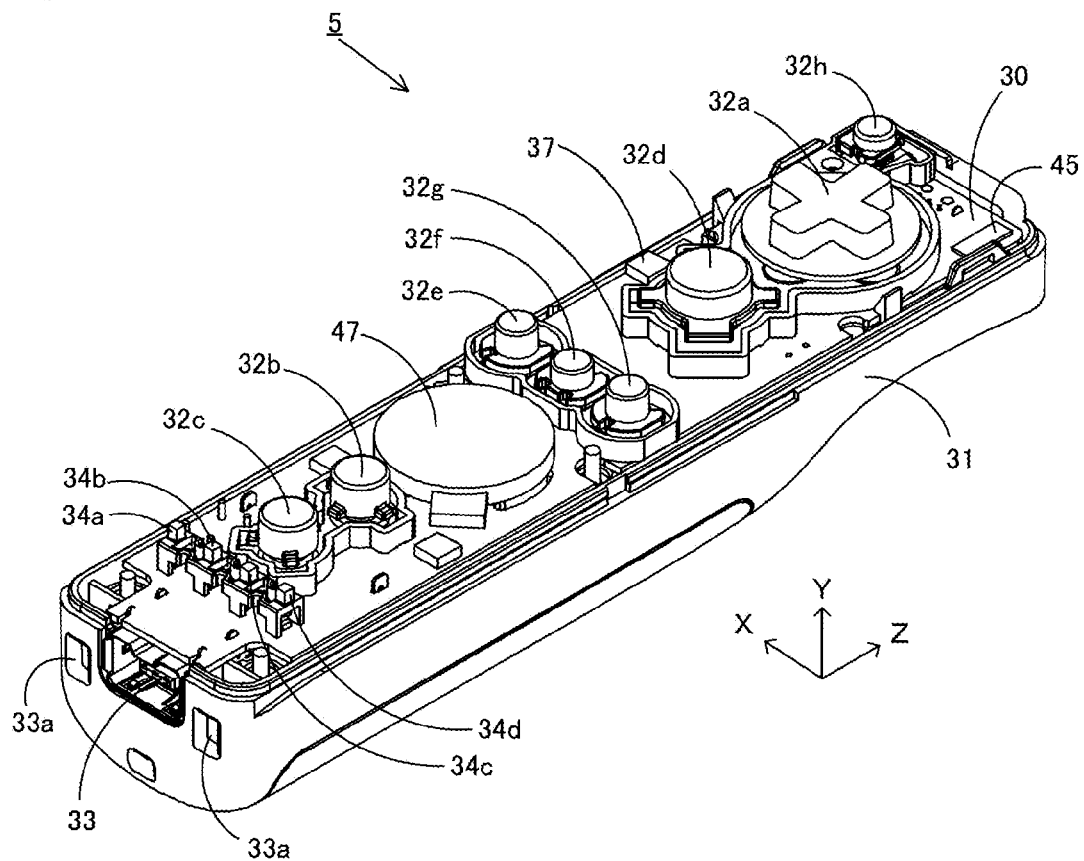
FIG. 5 is a diagram illustrating an internal configuration of the controller.
Figure 6:
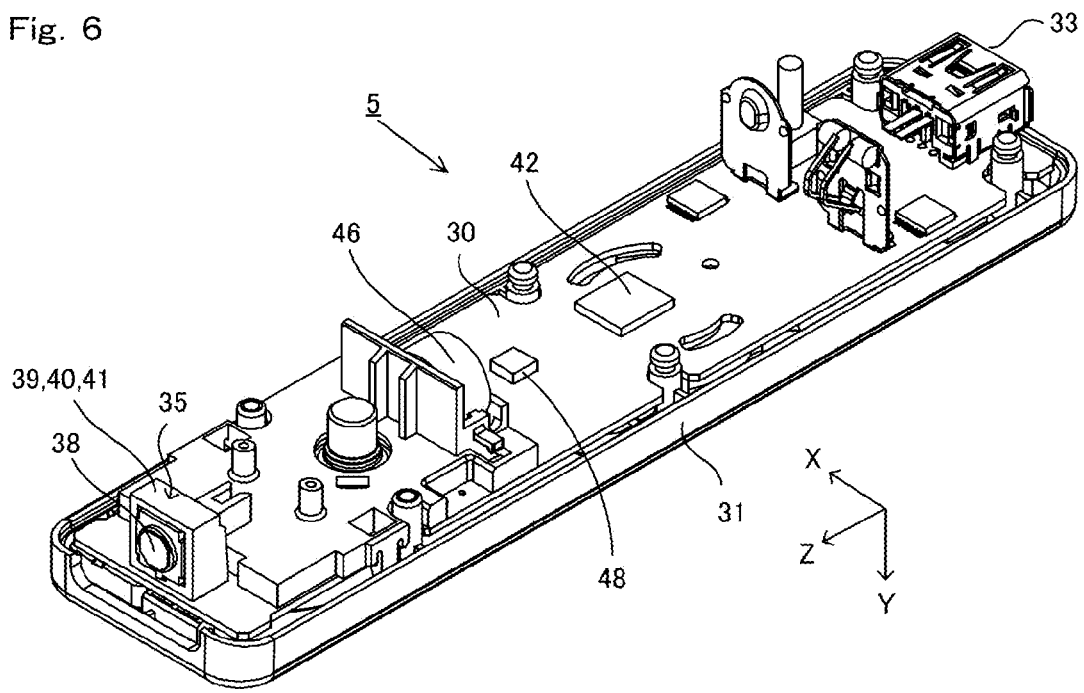
FIG. 6 is another diagram illustrating the internal configuration of the controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the controller 5 with respect to the X-axis direction. Thus, calculation of the motion of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present example embodiment, the vibrator 46 is disposed slightly toward the front of the housing 31. That is, the vibrator 46 is positioned offset from the center toward the end of the controller 5, and therefore the vibration of the vibrator 46 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 47, and the like.

FIGS. 3 to 6 only show examples of the shape of the controller 5, the shape of each operation button, the number and the positions of acceleration sensors and vibrators, and so on, and other shapes, numbers, and positions may be employed. Further, although in the present example embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
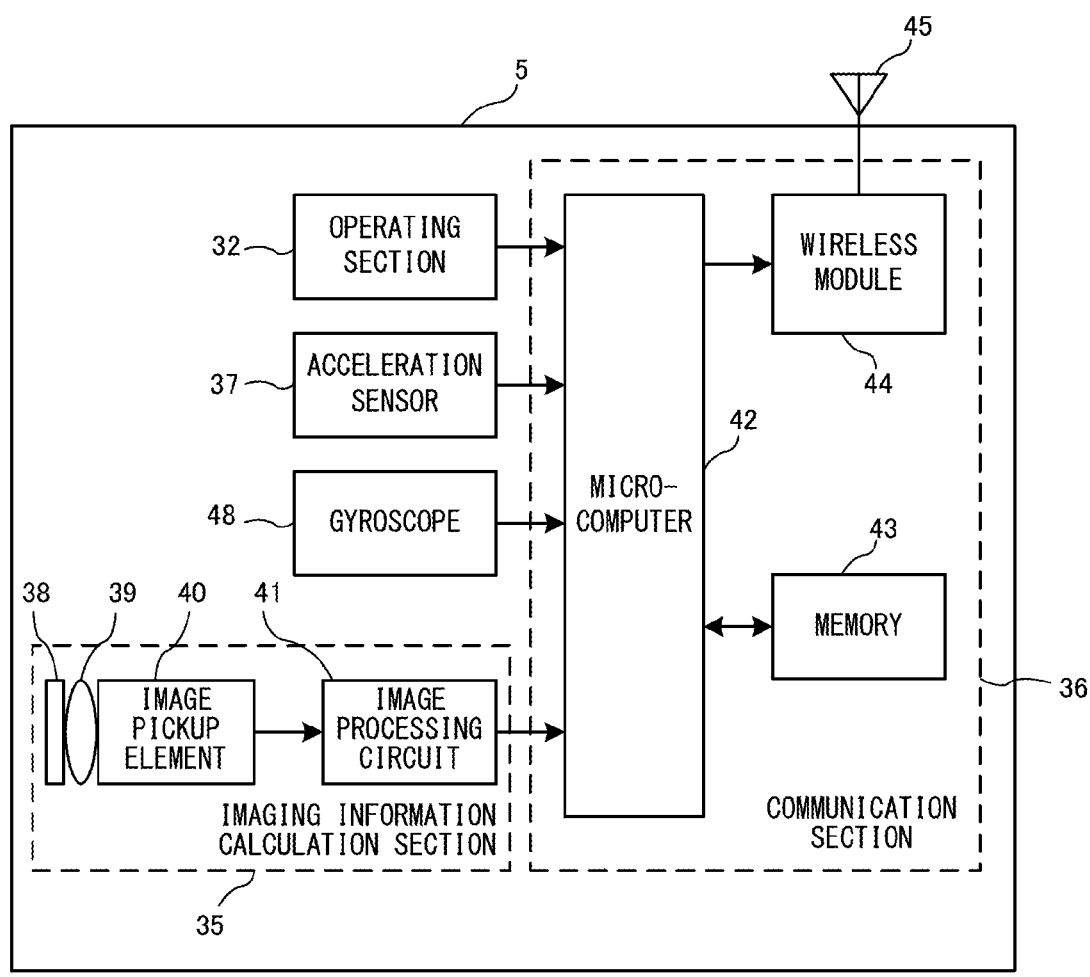
FIG. 7 is a block diagram illustrating a configuration of the controller.

FIG. 7 is a block diagram illustrating a configuration of the controller 5. The controller 5 includes an operating section 32 (the operation buttons 32a to 32i), the imaging information calculation section 35, a communication section 36, the acceleration sensor 37, and a gyroscope 48. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and movement of the controller 5, and therefore the game apparatus 3 is allowed to calculate the attitude and movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 73 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (e.g., gravitational acceleration), the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

Data outputted from the operating section 32, the imaging information calculation section 35, the acceleration sensor 37, and the gyroscope 48 to the microcomputer 42 is temporarily stored to the memory 43. The data is transmitted as operation data (controller operation data) to the game apparatus 3. Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data is transmitted at a cycle of a shorter time period. The communication section 36 of the controller 5 outputs, to the controller communication module 19 of the game apparatus 3, the operation data at intervals of 1/200 of a second, for example.

As described above, the controller 5 can transmit marker coordinate data, acceleration data, angular rate data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the controller 5 to arbitrary attitudes, pointing the controller 5 to arbitrary positions on the screen, and moving the controller 5 itself.

Also, in the present example embodiment, the controller 5 is not provided with any display means for displaying game images, but the controller 5 may be provided with a display means for displaying an image or suchlike to indicate, for example, a remaining battery level.

4. Configuration of the Terminal Device 7

Figure 8:
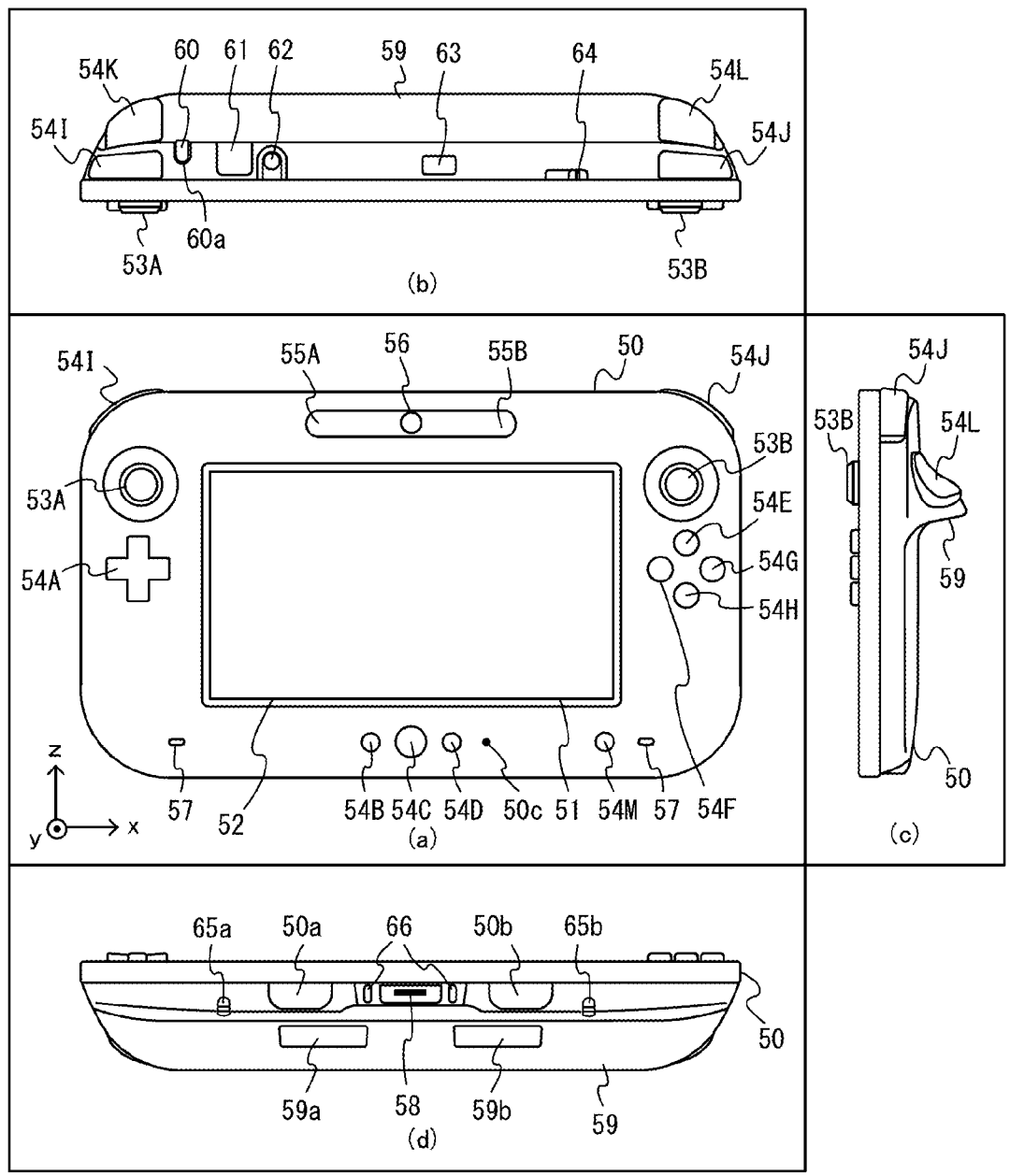
FIG. 8 is a diagram illustrating an external configuration of an example non-limiting terminal device.
Figure 9:
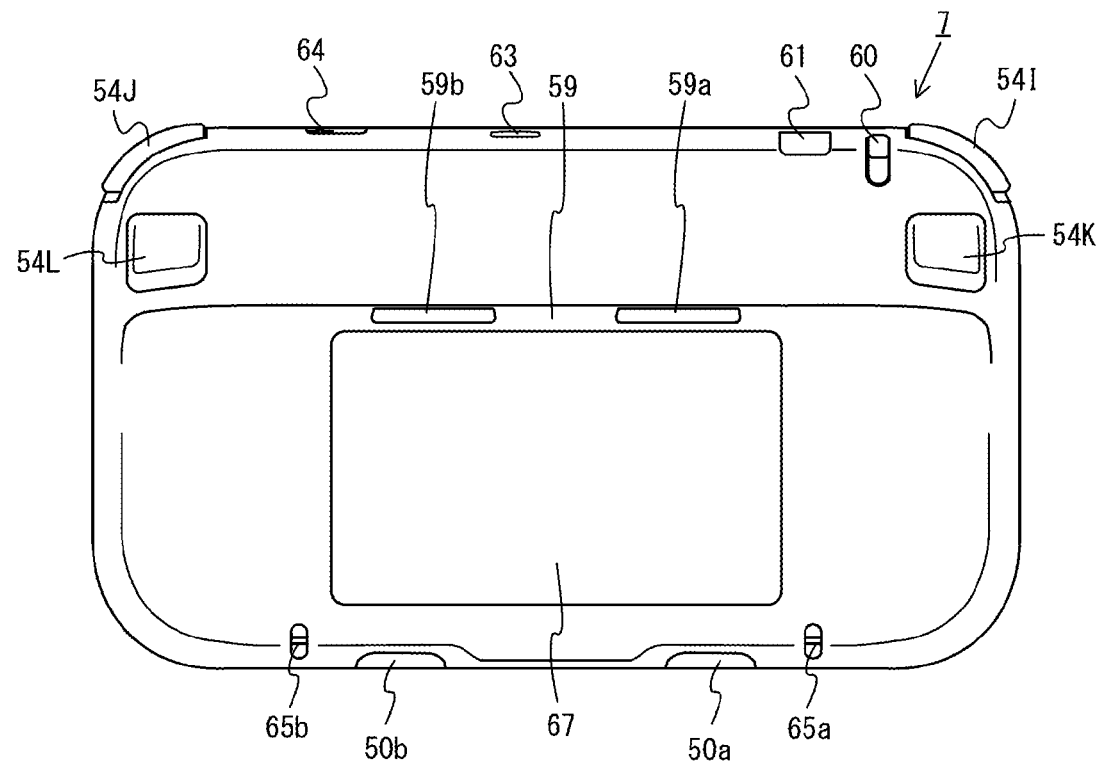
FIG. 9 is another diagram illustrating the external configuration of the terminal device.
Figure 10:
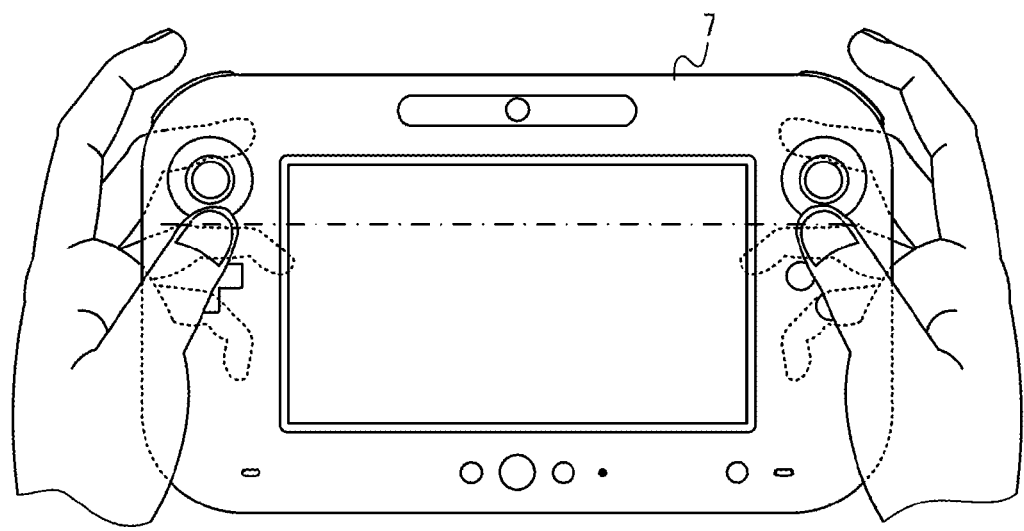
FIG. 10 is a diagram illustrating an example of the terminal device being held by the user in a landscape position.

Next, referring to FIGS. 8 to 11, the configuration of the terminal device 7 will be described. FIG. 8 is a plan view showing an external configuration of the terminal device 7. FIG. 8(a) is a front view of the terminal device 7, FIG. 8(b) is a top view thereof, FIG. 8(c) is a right side view thereof, and FIG. 8(d) is a bottom view thereof. FIG. 9 is a back view of the terminal device 7. FIG. 10 is a diagram showing a user holding the terminal device 7 in a landscape position.

As shown in FIG. 8, the terminal device 7 includes a housing 50 generally in a horizontally-elongated rectangular plate shape. That is, it can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. The longitudinal (z-axis direction) length of the terminal device 7 is 100 to 150 [mm], for example, and is 133.5 [mm] in the present embodiment. The widthwise (x-axis direction) length of the terminal device 7 is 200 to 250 [mm], for example, and is 228.26 [mm] in the present embodiment. The thickness (the length in the y-axis direction) of the terminal device 7 is, for example, about 15 to about 30 [mm] in a plate-shaped portion and about 30 to about 50 [mm] including the thickest part, and is 23.6 (40.26 in the thickest part) [mm] in the present embodiment. The weight of the terminal device 7 is about 400 to about 600 [g], and is 530 [g] in the present embodiment.

Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The size of the screen of the LCD 51 is 5 inches or larger, for example, and is herein 6.2 inches. The terminal device 7 of the present embodiment has such a configuration that it is easily held and operated, and it is therefore easy to operate even if a large LCD is provided. In other embodiments, the terminal device 7 may be of a relatively small size with the provision of a smaller LCD 51. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIG. 10. While FIG. 10 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(*a*), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, the present invention is not limited to using the touch pen 60, and an input may be made on the touch panel 52 with a finger of the user. The housing 50 is provided with a hole 60*a* for accommodating the touch pen 60 used for performing operations on the touch panel 52 (see FIG. 8(*b*)). While the hole 60*a* is provided on the upper surface of the housing 50 so that the touch pen 60 does not fall, it may be provided on the side surface or the bottom surface. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons (keys) 54A to 54M, as operation mechanisms (operation sections). The analog sticks 53A and 53B are each a direction-specifying device. The analog sticks 53A and 53B are each configured so that the movable member (stick portion) operated with a finger of the user can be slid in any direction (at any angle in the up, down, left, right and diagonal directions) with respect to the surface of the housing 50. That is, it is a direction input device which is also called a slide pad. The movable member of each of the analog sticks 53A and 53B may be of such a type that it is tilted in any direction with respect to the surface of the housing 50. Since the present embodiment use analog sticks of such a type that the movable members slide, the user can operate the analog sticks 53A and 53B without significantly moving the thumbs, and therefore operations can be made while the housing 50 is held more firmly. When analog sticks of such a type that the movable members tilt are used as the analog sticks 53A and 53B, the degree of input (the degree of tilt) is better perceived by the user, thus allowing the user to more easily perform precise operations.

The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 10, the analog sticks 53A and 53B are provided at such positions that the user can operate them while holding the left and right portions of the terminal device 7 (the left and right opposing end portions with respect to the LCD 51), and therefore the user can easily operate the analog sticks 53A and 53B even when holding and moving the terminal device 7.

The buttons 54A to 54L are operation mechanisms (operation sections) for making predetermined inputs, and are keys that can be pressed. As will be discussed below, the buttons 54A to 54L are provided at such positions that the user can operate them while holding the left and right portions of the terminal device 7 (see FIG. 10). Therefore, the user can easily operate these operation mechanisms even when holding and moving the terminal device 7.

As shown in FIG. 8(*a*), the cross button (direction-input button) 54A and the buttons 54B to 54H and 54M, of the operation buttons 54A to 54L, are provided on the front surface of the housing 50. That is, these buttons 54A to 54H and 54M are provided at positions at which they can be operated by the thumbs of the user (see FIG. 10).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game apparatus 3 can be remotely turned ON/OFF by operating the power button 54M. The power button 54M is provided on the lower side of the LCD 51 as are the buttons 54B to 54D. The power button 54M is provided on the right side of the buttons 54B to 54D. Thus, the power button 54M is provided at a position at which it can be operated (easily operated) with the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, the analog sticks 53A and 53B are provided above the cross button 54A and the buttons 54E to 54H. Here, the analog sticks 53A and 53B protrude beyond the cross button 54A and the buttons 54E to 54H in the thickness direction (the y-axis direction). Therefore, if the positions of the analog stick 53A and the cross button 54A are reversed, the thumb of the user may inadvertently touch the analog stick 53A when the user is operating the cross button 54A with the thumb. A similar problem occurs also when the positions of the analog stick 53B and the buttons 54E to 54H are reversed. In contrast, in the present embodiment, since the analog sticks 53A and 53B are provided above the cross button 54A and the buttons 54E to 54H, the possibility that a finger may inadvertently touch the cross button 54A and the buttons 54E to 54H when the user is operating the analog sticks 53A and 53B is small. Thus, in the present embodiment, the possibility of erroneous operations can be reduced, and it is possible to improve the controllability of the terminal device 7. Note however that in other embodiments, the positions of the analog stick 53A and the cross button 54A may be reversed and the positions of the analog stick 53B and the buttons 54E to 54H may be reversed as necessary.

Here, in the present embodiment, some operation sections (the analog sticks 53A and 53B, the cross button 54A, and the three buttons 54E to 54G) are provided on the left and right opposing sides of the display section (the LCD 51) and above the center of the housing 50 in the up/down direction (y-axis direction). When operating these operation sections, the user primarily holds a portion of the terminal device 7 that is above the center thereof in the up/down direction. If the user holds the lower portion of the housing 50, the terminal device 7 to be held becomes unstable, making it more difficult for the user to hold the terminal device 7. In contrast, in the present embodiment, when operating the operation section, the user primarily holds a portion of the terminal device 7 that is above the center thereof in the up/down direction, and the housing 50 can be supported from the sides by the palms. Therefore, the user can stably hold the housing 50 and it is made easier to hold the terminal device 7, thus making it easier to operate the operation section. In other embodiments, operation sections are provided, at least one on the left and one on the right of the display section, above the center of the housing 50. For example, only the analog sticks 53A and 53B may be provided above the center of the housing 50. For example, in a case in which the cross button 54A is provided above the left analog stick 53A and the four buttons 54E to 54H are provided above the right analog stick 53B, the cross button 54A and the four buttons 54E to 54H may be provided above the center of the housing 50.

In the present embodiment, a projecting portion (an eave portion 59) is provided on the back side of the housing 50 (the side opposite to the front surface where the LCD 51 is provided) (see FIGS. 8(*c*) and 9). As shown in FIG. 8(*c*), the eave portion 59 is a ridge-shaped member which projects from the back surface of the generally plate-shaped housing 50. The projecting portion has such a height (thickness) that it can rest on fingers of the user holding the back surface of the housing 50. The height of the projecting portion is 10 to [mm], for example, and is 16.66 [mm] in the present embodiment. The bottom surface of the projecting portion may have an inclination of 45° or more (e.g., 60° or more) with respect to the back surface of the housing 50 so that the projecting portion easily rests on fingers of the user. As shown in FIG. 8(*c*), the bottom surface of the projecting portion may have a larger inclination angle than the upper surface. As shown in FIG. 10, the user can hold the terminal device 7 stably without getting tired even if the terminal device 7 has a relatively large size by holding the terminal device 7 with the eave portion 59 resting on the fingers (the eave portion 59 being placed on the fingers). That is, the eave portion 59 can be referred to as a supporting member by means of which the housing 50 is supported by fingers, and can be referred to also as a finger-resting portion.

The eave portion 59 is provided above the center of the housing 50 with respect to the up/down direction. The eave portion 59 is provided on the reverse side so as to generally correspond to the operation sections (the analog sticks 53A and 53B) which are provided on the front surface of the housing 50. That is, the projecting portion is provided so as to extend across an area on the reverse side including positions corresponding to the operation sections which are provided respectively on the left side and on the right side of the display section. Therefore, when operating the operation section, the user can hold the terminal device 7 so as to support the eave portion 59 with the middle fingers or the ring fingers (see FIG. 10). Then, it is easier to hold the terminal device 7, and it is easier to operate the operation sections. In the present embodiment, since the projecting portion has an eave-like shape extending in the left/right direction, the user can hold the terminal device 7 with the middle fingers or the ring fingers placed along the bottom surface of the projecting portion, making it easier to hold the terminal device 7. The eave portion 59 is not limited to the shape extending in the horizontal direction as shown in FIG. 9, as long as it is formed so that it (i.e., a projecting portion thereof) extends in the left/right direction. In other embodiments, the eave portion 59 may extend in a direction that is slightly inclined from the horizontal direction. For example, the eave portion 59 may be provided so as to be inclined upwardly (or downwardly) from the left and right opposing end portions toward the center.

The present embodiment employs the eave portion 59 having a shape of an eave as the projecting portion formed on the back surface of the housing for the purpose of providing engagement holes to be described below in the eave portion 59, but the projecting portion may have any other suitable shape. For example, in other embodiments, two projecting portions may be provided in the left and right opposing portions (with no projecting portion in the center of the left/right direction) on the back side of the housing 50 (see FIG. 29). In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eave portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 may include a down-facing surface (the bottom surface of the projecting portion) formed in the left and right opposing portions of the back surface. Then, the user can easily hold the controller device with fingers abutting against this surface. While the "down-facing surface" may be provided at any position on the back surface of the housing 50, it may be located above the center of the housing 50.

As shown in FIGS. 8(*a*), 8(*b*) and 8(*c*), a first L button 54I and a first R button 54J are provided respectively in the right and left opposing portions on the upper surface of the housing 50. In the present embodiment, the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface (in other words, it is exposed on both the upper and left side surfaces). The first R button 54J is provided at the right end of the upper side surface of the housing 50, and is exposed on the upper right side surface (in other words, it is exposed on both the upper and right side surfaces). Thus, the first L button 54I is provided at such a position that it can be operated with the left index finger of the user, and the first R button 54J is provided at such a position that it can be operated with the right index finger of the user (see FIG. 10). In other embodiments, the operation sections provided respectively in the left and right portions of the upper surface of the housing 50 do not have to be provided at the left end and the right end, and may be provided at positions other than the end portions. The operation sections may be provided respectively on the left and right side surfaces of the housing 50.

As shown in FIGS. 8(c) and 9, a second L button 54K and a second R button 54L are provided on the projecting portion (the eave portion 59). The second L button 54K is provided near the left end of the eave portion 59. The second R button 54L is provided near the right end of the eave portion 59. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to (generally) correspond to the left analog stick 53A provided on the front surface, and the second R button 54L is provided on the reverse side so as to (generally) correspond to the right analog stick 53B provided on the front surface. Thus, the second L button 54K is provided at a position at which it can be operated with the left middle finger (or left index finger) of the user, and the second R button 54L is provided at a position at which it can be operated with the right middle finger (or right index finger) of the user (see FIG. 10). The second L button 54K and the second R button 54L are provided on the upper surface of the eave portion 59 as shown in FIG. 8(c). Therefore, the surfaces of the second L button 54K and the second R button 54L face upward (diagonally upward). It is assumed that the middle fingers or the index fingers will generally move in the up/down direction when the user holds the terminal device 7, and it will be easier for the user to press the second L button 54K and the second R button 54L if the button surfaces are facing upward.

As described above, in the present embodiment, operation sections (the analog sticks 53A and 53B) are provided respectively on the left side and the right side of the display section (the LCD 51) above the center of the housing 50, and other operation sections (the second L button 54K and the second R button 54L) are provided on the back side of the housing 50 so as to generally correspond respectively to the operation sections. Thus, since the operation sections and the other operation sections are provided on the front side and on the back side of the housing 50 so as to generally correspond to each other, the user can hold the housing 50 so as to sandwich the housing 50 from the front side and from the back side when operating these operation sections. When operating these operation sections, the user holds a portion of the housing 50 that is above the center thereof in the up/down direction, and therefore the terminal device 7 can be held in the upper portion thereof and the terminal device 7 can be supported by the palms (see FIG. 10). Thus, the user can stably hold the housing 50 in a state in which the user can operate at least four operation sections, and it is therefore possible to provide a controller device (the terminal device 7) which can be easily held by the user and which has a good controllability.

As described above, in the present embodiment, the user can easily hold the terminal device 7 by holding the terminal device 7 with fingers abutting against the bottom surface of the projecting portion (the eave portion 59). Since the second L button 54K and the second R button 54L are provided on the upper surface of the projecting portion, the user can easily operate these buttons in such a state as described above. The user can easily hold the terminal device 7 in the following manner, for example.

That is, as shown in FIG. 10, the user can hold the terminal device 7 with the ring fingers abutting against the bottom surface of the eave portion 59 (the one-dot-chain line shown in FIG. 10) (so as to support the eave portion 59 with the ring fingers). Then, the user can operate the four buttons (the first L button 54I, the first R button 54J, the second L button 54K and the second R button 54L) with the index fingers and the middle fingers. For example, in a case in which required game operations are relatively complicated and many buttons are to be used, it is possible to easily operate many buttons by holding the terminal device 7 as shown in FIG. 10. Since the analog sticks 53A and 53B are provided above the cross button 54A and the buttons 54E to 54H, the user can advantageously operate the analog sticks 53A and 53B with the thumbs when relatively complicated operations are required. In FIG. 10, the user holds the terminal device 7 with the thumbs abutting against the front surface of the housing 50, the index fingers against the upper surface of the housing 50, the middle fingers against the upper surface of the eave portion 59 on the back surface of the housing 50, the ring fingers against the bottom surface of the eave portion 59, and the little fingers against the back surface of the housing 50. Thus, the user can firmly hold the terminal device 7 as if to wrap around the housing 50 from four directions.

The user can also hold the terminal device 7 with the middle fingers abutting against the bottom surface of the eave portion 59. Then, the user can easily operate two buttons (the second L button 54K and the second R button 54L) with the index fingers. For example, in a case in which required game operations are relatively simple and only a few buttons are to be used, the terminal device 7 may be held with the middle fingers abutting against the bottom surface of the eave portion 59. Then, since the user can hold the lower side of the housing 50 with two fingers (the ring finger and the little finger), it is possible to firmly hold the terminal device 7.

In the present embodiment, the eave portion 59 is provided so that the bottom surface thereof is located between the analog sticks 53A and 53B and the cross button 54A and the four buttons 54E to 54H (so that it is located on the lower side of the analog sticks 53A and 53B and above the cross button 54A and the four buttons 54E to 54H). Therefore, in a case in which the terminal device 7 is held with the ring fingers abutting against the eave portion 59 (FIG. 10), the analog sticks 53A and 53B can be easily operated with the thumbs, and in a case in which the terminal device 7 is held with the middle fingers abutting against the eave portion 59, the cross button 54A and the four buttons 54E to 54H can be easily operated with the thumbs. That is, in either of the two cases, the user can make a direction input operation while firmly holding the terminal device 7.

As described above, the user can also hold the terminal device 7 in a portrait position. That is, the user can hold the terminal device 7 in a portrait position by holding the top side or the lower side of the terminal device 7 with one hand. Thus, since the user can hold the terminal device 7 with one hand, it is possible to for example perform an operation in which the terminal device 7 is held with one hand while an input is made to the touch panel 52 with the other hand.

In a case in which the top side of the terminal device 7 is held, the user can firmly hold the terminal device 7 by having fingers other than the thumbs abutting against the bottom surface of the eave portion 59. In the present embodiment, since the eave portion 59 extends in the left/right direction, the user can abut fingers other than the thumbs against the eave portion 59 and firmly hold the terminal device 7, irrespective of the position along the top side of the terminal device 7 at which the user holds the terminal device 7. That is, in a case in which the terminal device 7 is used in a portrait position, the eave portion 59 can be used as a grip. On the other hand, in a case in which the bottom side of the terminal device 7 is held with one hand, the user can operate the buttons 54B to 54D with that hand. Therefore, it is possible for example to operate the buttons 54B to 54D with the hand with which the terminal device 7 is held while making inputs to the touch panel 52 with the other hand, thereby allowing for more operations.

With the terminal device 7 of the present embodiment, since the projecting portion (the eave portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eave portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eave portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc. The terminal device 7 may include a button for turning ON/OFF the power of the LCD 51, and a button for performing a connection setting (pairing) with the game apparatus 3.

As shown in FIG. 8(a), the terminal device 7 includes the marker section 55 including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker section 55 is used for the game apparatus 3 to calculate the movement, etc., of the controller 5, as is the marker device 6 described above. The game apparatus 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 79 as a sound input mechanism. A microphone hole 50c is provided on the front surface of the housing 50. The microphone 79 is provided inside the housing 50 behind the microphone hole 50c. The microphone 79 detects sounds around the terminal device 7 such as the voice of the user.

The terminal device 7 includes speakers 77 as sound output means. As shown in FIG. 8(d), speaker holes 57 are provided in a lower portion of the front surface of the housing 50. The output sounds from the speakers 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speakers 77. The terminal device 7 includes a sound output terminal 62 for receiving a sound output section such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. In the present embodiment, the extension connector 58 is provided on the lower side surface of the housing 50 as shown in FIG. 8(d). The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7. In the present embodiment, the charging terminal 66 is provided on the lower side surface of the housing 50. Therefore, when the terminal device 7 and an additional device are connected to each other, it is possible to supply power from one to the other, in addition to exchanging information therebetween, via the extension connector 58. Thus, with the provision of the charging terminal 66 around (on the left and right opposing sides of) the extension connector 58, it is possible to supply power, as well as exchange information, when the terminal device 7 and an additional device are connected to each other. The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger. Although the charging connector (the cover portion 61) is provided on the upper side surface of the housing 50 in view of the fact that an additional device is connected to the lower side surface of the housing in the present embodiment, it may be provided on the left and right side surfaces or the lower side surface.

As shown in FIGS. 8(d) and 9, engagement holes 59a and 59b with which tab portions of an additional device can engage are provided on the bottom surface of the projecting portion (the eave portion 59). The engagement holes 59a and 59b are used when connecting an additional device to the terminal device 7. That is, the additional device includes tab portions which can engage with the engagement holes 59a and 59b, and when connecting the additional device to the terminal device 7, the tab portions are engaged with the engagement holes 59a and 59b, thereby securing the terminal device 7 and the additional device with each other. Threaded holes may be further provided inside the engagement holes 59a and 59b so that the additional device can be securely fixed by screws. The projecting portion provided on the back surface of the terminal device 7 is herein the eave portion 59 having an eave-like shape. That is, the eave portion 59 is provided so as to extend in the left/right direction. As shown in FIG. 9, the engagement holes 59a and 59b are provided near the center (with respect to the left/right direction) of the bottom surface of the eave portion 59. While the number of the engagement holes 59a and 59b provided on the bottom surface of the eave portion 59 is not limited to any particular number, if there is one engagement hole, it may be provided at the center of the eave portion 59, and if there are a plurality of engagement holes, they may be provided in left-right symmetry. Then, the additional device can be stably connected while evenly maintaining the left-right balance. In a case in which the engagement holes are provided near the center, the size of the additional device can be reduced. Thus, the eave portion 59 can be used as a member for engaging the additional device.

In the present embodiment, engagement holes 50a and 50b are provided on the bottom surface of the housing 50 as shown in FIG. 8(d). Therefore, in a case in which the additional device is connected to the terminal device 7, four tab portions are respectively engaged with four engagement holes, thereby securing the terminal device 7 and the additional device with each other. Thus, the additional device can be more securely connected to the terminal device 7. Threaded holes may be provided also inside the engagement holes 50a and 50b so that the additional device can be screwed thereto. While screwing may be done at any position, the support portion of the additional device, which lies against the reverse surface of the housing 50, and the eave portion 59 may be screwed together, for example. In other embodiments, the engagement holes provided in the housing may be in any arrangement.

The terminal device 7 includes a battery cover 67 which can be attached to and removed from the housing 50. A battery (a battery 85 shown in FIG. 11) is placed inside the battery cover 67. In the present embodiment, the battery cover 67 is provided on the back side of the housing 50, below the projecting portion (the eave portion 59).

The housing 50 of the terminal device 7 includes holes 65a and 65b through which a strap cord can be tied to the terminal device 7. As shown in FIG. 8(d), the holes 65a and 65b are provided on the bottom surface of the housing 50 in the present embodiment. Two holes 65a and 65b are provided in the present embodiment, one in the left portion and another in the right portion of the housing 50. Specifically, the hole 65a is provided on the left side of the center of the bottom surface of the housing 50, and the hole 65b is provided on the right side of the center of the bottom surface of the housing 50. The user can tie a strap to one of the holes 65a and 65b, and fasten the strap to the wrist of the user. Then, even if the user drops the terminal device 7 or if the terminal device 7 comes off the hand, the terminal device 7 is prevented from falling or hitting other objects. In the present embodiment, since the holes are provided both in the left and right portions, the user can conveniently fasten a strap to either hand.

With the terminal device 7 shown in FIGS. 8 to 11, the shape of each operation button, the shape of the housing 50, the number and the positions of the components, etc., are merely illustrative, and the present invention can be realized with other shapes, numbers, and positions.

Figure 11:
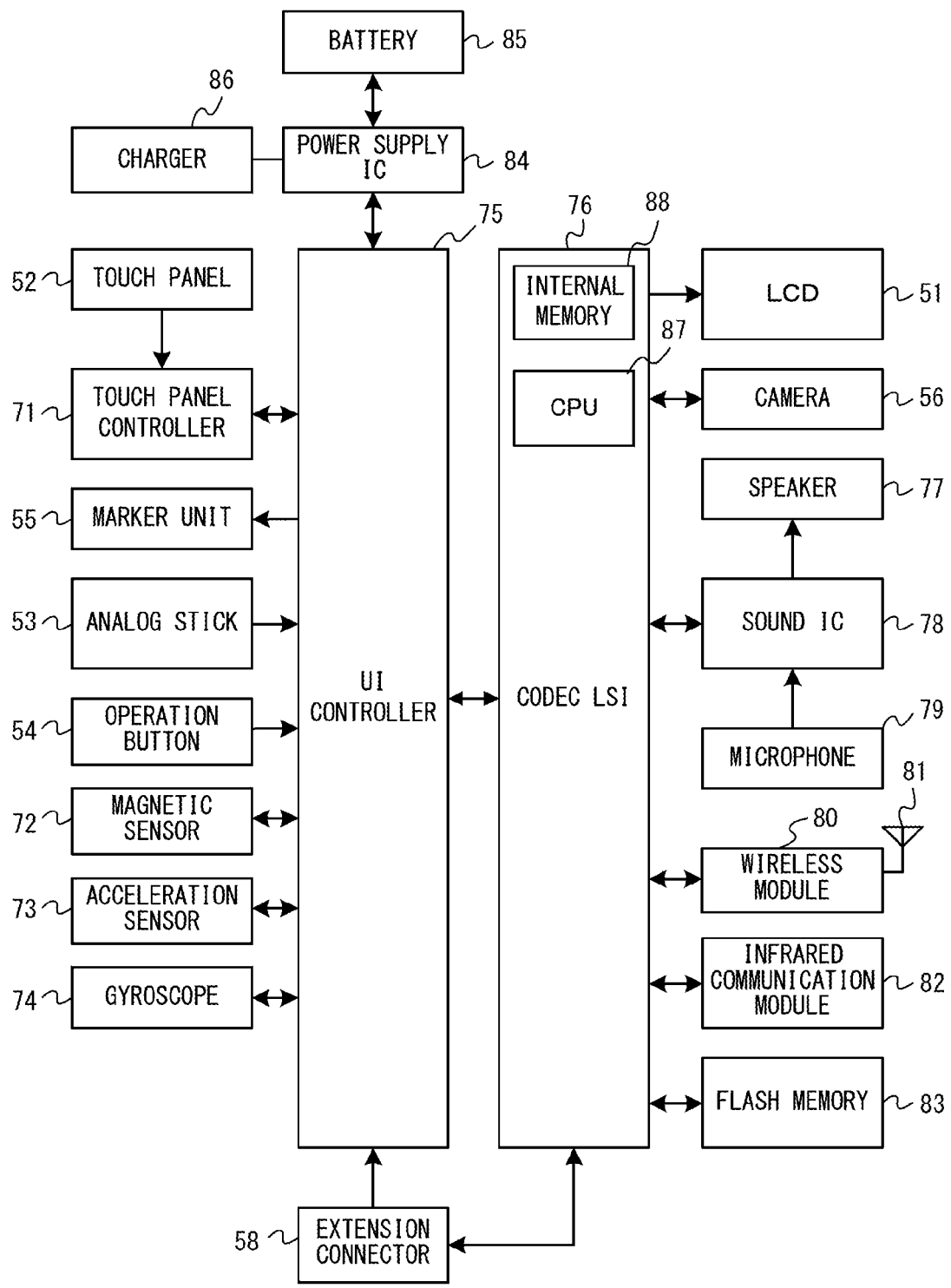
FIG. 11 is a block diagram illustrating an internal configuration of the terminal device.

Next, an internal configuration of the terminal device 7 will be described with reference to FIG. 11. FIG. 11 is a block diagram showing an internal configuration of the terminal device 7. As shown in FIG. 11, in addition to the configuration shown in FIG. 8, the terminal device 7 includes a touch panel controller 71, a magnetic sensor 72, the acceleration sensor 73, the gyroscope 74, a user interface controller (UI controller) 75, a codec LSI 76, the speakers 77, a sound IC 78, the microphone 79, a wireless module 80, an antenna 81, an infrared communication module 82, a flash memory 83, a power supply IC 84, and a battery 85. These electronic components are mounted on an electronic circuit board and accommodated in the housing 50.

The UI controller 75 is a circuit for controlling the input/output of data to/from various input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, and the gyroscope 74. The UI controller 75 is connected to the codec LSI 76 and the extension connector 58. The power supply IC 84 is connected to the UI controller 75, and power is supplied to various sections via the UI controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function. That is, although not shown in the drawings, a cradle with which power can be obtained from an external power supply can be connected to the power supply IC 84 via the charging terminal 66, and the terminal device 7 can receive power supply from or be charged by an external power supply using the cradle.

The touch panel controller 71 is a circuit connected to the touch panel 52 for controlling the touch panel 52. The touch panel controller 71 generates touch position data of a predetermined format based on signals from the touch panel 52, and outputs it to the UI controller 75. The touch position data represents, for example, the coordinates of a position on the input surface of the touch panel 52 at which an input is made. The touch panel controller 71 reads a signal from the touch panel 52 and generates touch position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects an azimuth by sensing the size and direction of the magnetic field. Azimuth data representing the detected azimuth is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect an azimuth. Strictly speaking, in a place where there is a magnetic field other than the geomagnetic field, the obtained azimuth data does not represent the azimuth. Nevertheless, if the terminal device 7 moves, the azimuth data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 8(*a*)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyroscope 74 is provided inside the housing 50 for detecting angular rates about the three axes, i.e., the x-axis, the y-axis and the z-axis. Angular rate data representing the detected angular rates is outputted to the UI controller 75. Control instructions for the gyroscope 74 are outputted from the UI controller 75 to the gyroscope 74. The number and combination of gyroscopes used for detecting angular rates about three axes may be arbitrary, and the gyroscope 74 may be formed by a 2-axis gyroscope and a 1-axis gyroscope, as is the gyroscope 48. The gyroscope 74 may be a gyroscope for 1-axis or 2-axis detection.

The UI controller 75 outputs, to the codec LSI 76, operation data including touch position data, stick data, operation button data, azimuth data, acceleration data, and angular rate data received from various components described above. If another device is connected to the terminal device via the extension connector 58, data representing an operation performed on the other device may be further included in the operation data.

The codec LSI 76 is a circuit for performing a compression process on data to be transmitted to the game apparatus 3, and an expansion process on data transmitted from the game apparatus 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not itself perform game processes, the terminal device 7 may execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game apparatus 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speakers 77 and the microphone 79 for controlling input/output of sound data to/from the speakers 77 and the microphone 79. That is, when sound data is received from the codec LSI 76, the sound IC 78 outputs sound signals obtained by performing D/A conversion on the sound data to the speakers 77 so that sound is outputted from the speakers 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The infrared communication module 82 emits an infrared signal to perform infrared communication with another device. Here, for example, the infrared communication module 82 has the function of performing infrared communication in accordance with the IrDA standard and the function of outputting an infrared signal (control signal) to control the television 2.

The codec LSI 76 transmits, as terminal operation data, image data from the camera 56, sound data from the microphone 79 and operation data from the UI controller 75 to the game apparatus 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game apparatus 3 via the antenna 81. The wireless module 80 has a similar function to that of the terminal communication module 28 of the game apparatus 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game apparatus 3 includes operation data (the terminal operation data), image data, and sound data. In a case in which another device is connected to the terminal device 7 via the extension connector 58, data received from the other device may be further included in the transmit data. The codec LSI 76 may transmit data received through infrared communication by the infrared communication module 82, to the game apparatus 3, with the data being included in the transmit data, where appropriate.

As described above, compressed image data and sound data are transmitted from the game apparatus 3 to the terminal device 7. These data are received by the antenna 81 (reception section) and transferred to the codec LSI 76 via the wireless module 80. The codec LSI 76 expands the received image data and sound data. The expanded image data is outputted to the LCD 51, and images are displayed on the LCD 51. That is, the codec LSI 76 (the CPU 87) displays the received image data on the display section. The expanded sound data is outputted to the sound IC 78, and the sound IC 78 outputs sounds from the speakers 77.

In a case in which control data is included in data received from the game apparatus 3, the codec LSI 76 and the UI controller 75 give control instructions to various sections in accordance with the control data. As described above, the control data is data representing control instructions for the components of the terminal device 7 (the camera 56, the touch panel controller 71, the marker section 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game apparatus 3. For the marker section 55, which is an infrared LED, the control can be done simply by turning ON/OFF the power supply thereto.

Furthermore, the game apparatus 3 is capable of controlling output of the infrared communication module 82, thereby controlling the operation of the television 2. Specifically, the game apparatus 3 outputs an instruction (control data as mentioned above) to the terminal device 7, thereby causing the infrared communication module 82 to output an infrared signal corresponding to a control command for controlling the television 2. In response to this instruction, the codec LSI 76 causes the infrared communication module 82 to output an infrared signal corresponding to the control command. Here, the television 2 includes an infrared light reception section capable of receiving the infrared signal. By the infrared light reception section receiving the infrared signal outputted by the infrared communication module 82, the television 2 operates in accordance with the infrared signal. Note that the instruction from the game apparatus 3 may indicate the pattern of the infrared signal, or when the terminal device 7 has the infrared signal pattern stored therein, the game apparatus 3 may provide an instruction to indicate the pattern.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyroscope 74 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

(Configuration for Connecting the Game System to an External Device)

Figure 12:
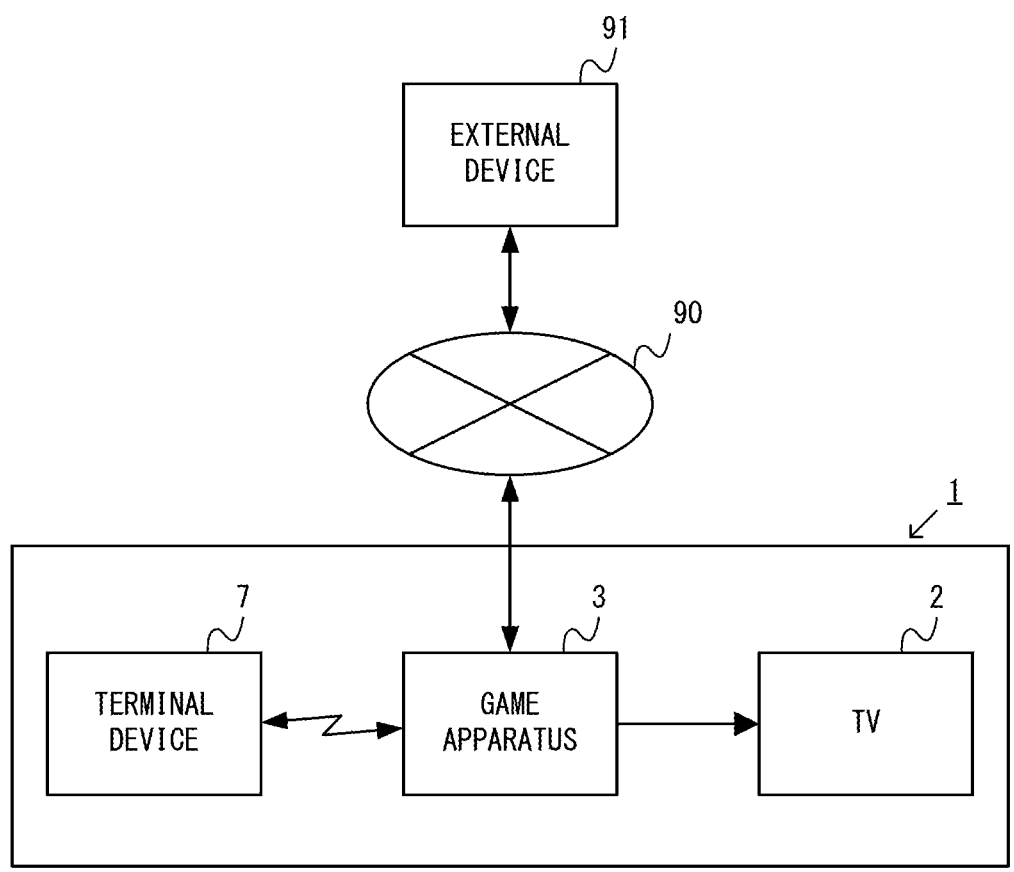
FIG. 12 is a block diagram illustrating an example connection relationship between the game system and an external device.

FIG. 12 is a block diagram illustrating the connection relationship between the game system 1 and an external device. As shown in FIG. 12, in the game system 1, the game apparatus 3 is capable of connecting to an external device 91 via a network 90. The network 90 is an arbitrary communication network such as the Internet. The external device 91 is a Web server or another terminal device (e.g., in the case of a communication game, a destination game apparatus) capable of communicating with the game apparatus 3. Note that there may be more than one external device 91, and the game apparatus 3 may communicate with a plurality of external devices. The game apparatus 3 communicates with the network 90, and acquires Web pages, various applications, game data, and so on, from the external device 91 via the network 90. The game apparatus 3 outputs the acquired image information, or any images, etc., generated on the basis of the acquired information, to the terminal device 7 and/or the television 2. The game system 1 is capable of displaying various images on two display devices.

5. General Operations in the Game System

Next, general operations performed in the game system 1 will be described. In the present example embodiment, the game system 1 is capable of executing various applications, including a game program (game application), performing operations on the television 2 (and displaying a television program guide), and displaying Web pages. Moreover, by operations shown below, the game system 1 allows a user-friendly operation for switching between a state where the television is used in the game system 1 (the television 2 displays images generated in the game system 1) and another state where the television is used for a purpose other than in the game system 1 (the television 2 displays images different from those generated in the game system 1).

Figure 13:
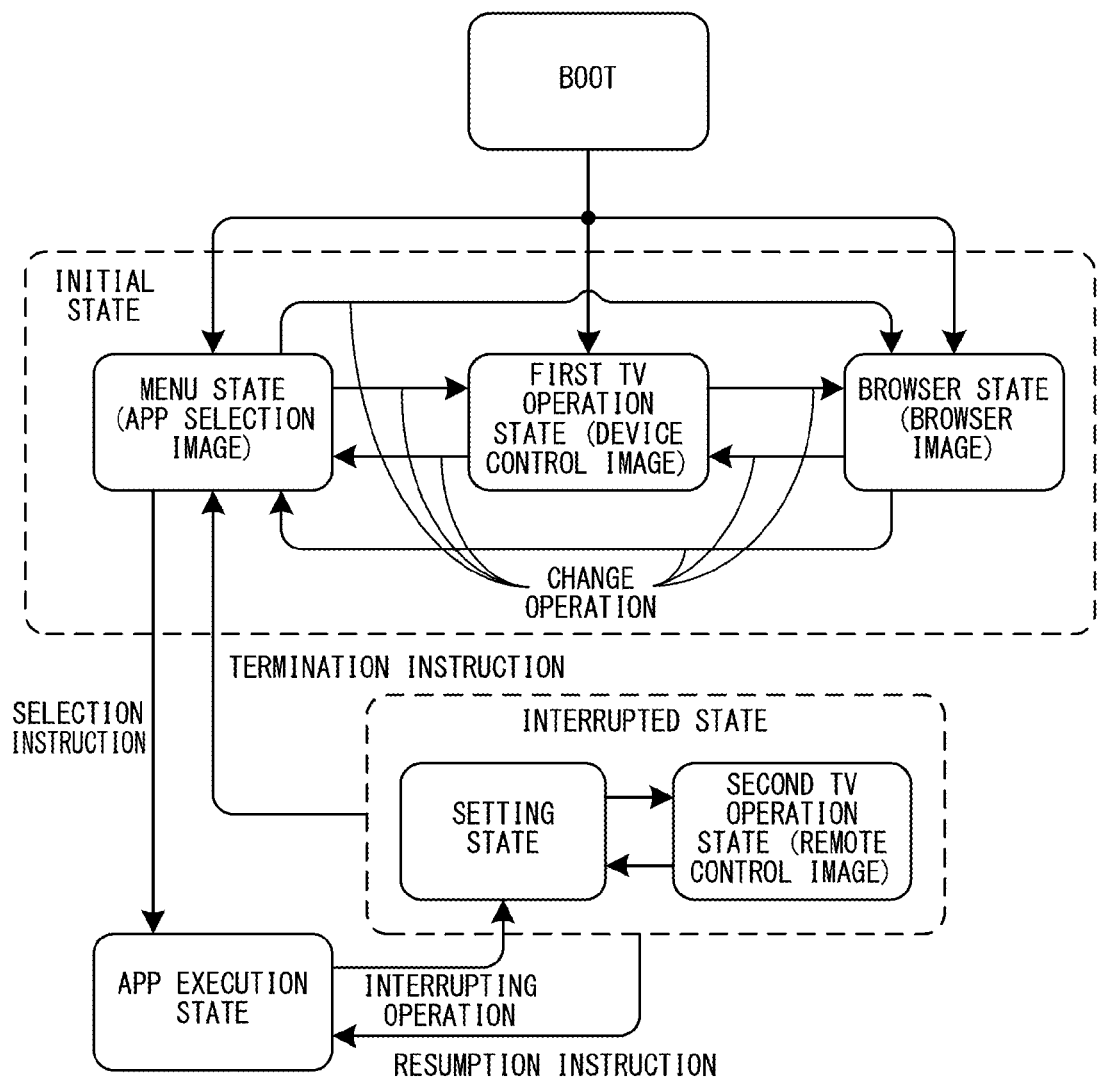
FIG. 13 is a state transition diagram representing transitions between operation states of the game system.

FIG. 13 is a state transition diagram representing transitions between operation states of the game system 1. As shown in FIG. 13, when the game system 1 (game apparatus 3) is booted, the game system 1 is first brought into an initial state. The "initial state" is a state after boot of the game system 1, in which the terminal device 7 displays a predetermined operation image. Here, the predetermined operation image may be any image allowing the user of the terminal device 7 to perform an operation. In the present example embodiment, the terminal device 7 displays any one of the following images to be described later: application selection image (hereinafter, indicated as "app selection image"); device control image; and browser image, as a predetermined operation image. Note that in another example embodiment, the terminal device 7 may display more than one of the three images at the same time (e.g., by dividing its display area). Moreover, in the following, any operation image displayed in the initial state may also be referred to as a "main operation image" for the purpose of being distinguished from any operation image displayed in an interrupted state to be described later.

Note that the "initial state" refers to a state after boot of the game apparatus 3, where an application can be selected, and is not limited to a state immediately after the boot. For example, a predetermined image may be displayed for a predetermined period of time immediately after the boot, and thereafter, the initial state may be brought about. Alternatively, the initial state may occur again after the execution and shutdown of a predetermined application.

In the initial state, the terminal device 7 displays a predetermined main operation image, and the terminal device is also used for an operation in the game system. Specifically, the terminal device 7, which is an operating device, includes an operation section for outputting operation data (terminal operation data) representing an operation on the operating device. Moreover, the terminal device 7 includes a reception section (antenna 81 and wireless module 80) for receiving an image outputted from the game apparatus 3, and display section (LCD 51) for displaying the received image. On the other hand, the game apparatus 3 includes an acquisition section for acquiring the operation data, and generates the main operation image in the initial state. In addition, the game apparatus 3 outputs the main operation image to the terminal device 7.

Note that, in the present example embodiment, the initial state includes "menu state", "first television operation state", and "browser state" as shown in FIG. 13. The menu state is a state (mode) in which various applications can be selected and executed. The first television operation state is a state (mode) in which the television 2 can be operated. The browser state is a state (mode) in which Web pages can be displayed. As will be described in detail later, the terminal device 7 displays the app selection image (FIG. 17) in the menu state, the device control image (FIG. 19) in the first television operation state, and the browser image (FIG. 21) in the browser state. Note that the app selection image is an operation image for selecting an application executable by the game apparatus 3. The device control image is an operation image for manipulating (controlling) the television 2. The browser image is an operation image including a Web page acquired via the network 90. Note that in the initial state, the terminal device 7 always displays a predetermined operation image (main operation image), and therefore, in another example embodiment, only one of the aforementioned images may always be displayed in the initial state.

Furthermore, when the game system 1 is booted into an initial state, the game system 1 takes one of the aforementioned three states (i.e., menu state, first television operation state, and browser state). Note that the state of the game system 1 immediately after boot may be determined arbitrarily. In the present example embodiment, the state of the game system 1 upon the last shutdown is set as the state immediately after boot. In addition, as will be described in detail later, the game system 1 can transition from one of the three states to any of the other two states in accordance with a predetermined change operation (see FIG. 13). Specifically, by the change operation, the user can readily switch operation images to be displayed on the terminal device 7 among the app selection image, the device control image, and the browser image.

Here, in the menu state of the initial state, the user can select and execute one of various applications, including game programs, using the terminal device 7. In addition, in the first television operation state of the initial state, the user can operate the television 2 using the terminal device 7. Specifically, in the initial state, on the basis of terminal operation data, the game apparatus 3 determines whether or not a selection instruction has been provided (step S14 to be described later), and also determines whether or not a control instruction has been provided (step S23 to be described later). The selection instruction is an instruction to select an application from one or more applications executable by the game apparatus 3, one of the applications being a game application. In addition, the control instruction is an instruction to control the television 2. When the selection instruction has been provided, the game apparatus 3 executes the selected application, and outputs an image generated by executing the application to either the terminal device 7 or the television 2, or both (step S15 to be described later). Moreover, when the control instruction has been provided, the game apparatus 3 controls the television 2 in accordance with the control instruction (step S24 to be described later).

Thus, in the present example embodiment, the terminal device 7 displays an operation image (main operation image) in the initial state, so that the user can operate the game system 1 while viewing the screen of the terminal device 7, and the television 2 can display other images such as a television program. Accordingly, the user can use the game system 1 while watching a television program. For example, while watching a television program on the screen of the television 2, the user can view an operation image on the terminal device 7 and select an application to be executed. Moreover, in the initial state, the user can operate the television 2 using the terminal device 7. The user can operate both the game system 1 and the television 2 using the terminal device 7, which makes it easy to perform an operation to switch between the state where the television is used in the game system 1 and the state where the television is used for a purpose other than in the game system 1. For example, in the present example embodiment, a television program guide (electronic program guide) is displayed as a device control image, so that, by simply using the terminal device 7, the user can perform a series of operations for booting the game system 1 to display the program guide on the terminal device 7, and selecting a desired television program from the displayed program guide to display the program on the television 2. In this manner, in the present example embodiment, the terminal device 7 makes it possible to enhance user-friendliness in the aforementioned switching operation.

Note that in the present example embodiment, the game apparatus 3 causes the terminal device 7 to display either the app selection image or the device control image at one time, but in another example embodiment, the terminal device 7 may display the app selection image and the device control image at the same time. As a result, the user can freely provide both the selection instruction and the control instruction without performing an operation (a change operation as mentioned above) to transition between the state (menu state) where the selection instruction can be provided and the state (first television operation state) where the control instruction can be provided. Alternatively, in another example embodiment, the game apparatus 3 may allow the user to provide the control instruction in the menu state where the app selection image is displayed, or may allow the user to provide the selection instruction in the first television operation state where the device control image is displayed. This also makes it possible for the user to freely perform the two instructions without performing the change operation.

Furthermore, in the initial state, the game apparatus 3 determines whether or not a display instruction to display a Web page has been provided (steps S17 and S26 to be described later). When the display instruction has been provided, the game system 1 transitions to the browser state (see FIG. 13). In this case, the game apparatus 3 outputs a browser image, which is generated on the basis of data acquired from the network 90 via an external communication section (network communication module 18) communicating with the network 90, to either the terminal device 7 or the television 2, or both (steps S31 and S35 to be described later). Specifically, in response to the display instruction, the game apparatus 3 causes the terminal device 7 and/or the television 2 to display a browser image including the Web page. In this manner, in the present example embodiment, the user can browse the Web page in the initial state.

Furthermore, when an operation to select an application is performed using the terminal device 7 in the menu state, the game apparatus 3 executes the selected application. Specifically, the game apparatus 3 generates a main operation image (an app selection image as mentioned above) including images (e.g., icons) representing applications executable by the game apparatus 3, and outputs the generated image to the terminal device 7. Thereafter, when the main operation image is displayed, and any application to be executed is selected, the selected application is executed. As a result, the game system 1 transitions to an app execution state, as shown in FIG. 13. Moreover, the game apparatus 3 outputs an image generated by executing the application to either the terminal device 7 or the television 2, or both. Note that one (or both) of the two display devices to which the image is outputted may be determined arbitrarily in accordance with the application to be executed.

In the app execution state, when a predetermined interruption operation is performed on the terminal device 7, the game system 1 transitions to the interrupted state (see FIG. 13). The interrupted state is a state where the use of the application being executed is interrupted. When the predetermined interruption operation is performed on the terminal device 7 while the application is being executed, the game apparatus 3 generates and outputs a predetermined operation image to the terminal device 7 (step S44 to be described later). The predetermined operation image may be any image allowing the user of the terminal device 7 to perform an operation. In the present example embodiment, the terminal device 7 displays a setting image (FIG. 23) or remote control image (FIG. 24) to be described later as the predetermined operation image. Note that in another example embodiment, the terminal device 7 may display only one operation image or may display the aforementioned two images at the same time. The operation image displayed in the interrupted state will be referred to below as the "sub-operation image".

The interrupted state includes a setting state and a second television operation state. In the present example embodiment, upon transition from the app execution state to the interrupted state, the game system 1 is brought into the setting state. The setting state is a state where the setting image is displayed. As will be described in detail later, the setting image is an operation image allowing various setting operations to be performed on the game system 1. While the terminal device 7 displays the predetermined sub-operation image in the interrupted state, in another example embodiment, the terminal device 7 may display only one of the two images without switching to the other during the interrupted state.

In the present example embodiment, when the predetermined operation is performed in the setting state, the game system 1 transitions to the second television operation state. The second television operation state is a state where the remote control image is displayed. As will be described in detail later, the remote control image is an operation image allowing an operation to be performed on the television 2, and including button images or suchlike which represent operations on the television 2. The second television operation state is a state where the television 2 can be operated using the terminal device 7. Note that in the second television operation state, when a predetermined operation is performed, the game system 1 transitions from the second television operation state to the setting state. That is, the user can freely make a transition between the setting state and the second television operation state by a predetermined operation (see FIG. 13).

In this manner, in the present example embodiment, the user can operate the television 2 in the interrupted state. Specifically, with the terminal device 7 displaying the sub-operation image, the game apparatus 3 determines whether or not a control instruction to control the television 2 has been provided, on the basis of terminal operation data. When the control instruction has been provided, the television 2 is controlled in accordance with the control instruction. Accordingly, in the present example embodiment, when an application is being used in the game system 1, the user can operate the television 2 without stopping the execution of the application. As a result, it is rendered possible to more readily perform an operation of switching between the state where the television is used in the game system 1 and the state where the television is used for a purpose other than in the game system 1. For example, by using the terminal device 7, the user can readily perform an operation to watch a television program while executing an application and afterward perform an operation to resume the application.

Furthermore, in the present example embodiment, the interrupted state allows a termination instruction to terminate an application being executed and a resumption instruction to resume the execution of an application. Specifically, when the resumption instruction is provided in the interrupted state, the game apparatus 3 resumes the execution of an application. As a result, the game system 1 transitions to the app execution state (see FIG. 13). In addition, when the termination instruction is provided in the interrupted state, the game apparatus 3 ends the execution of an application. As a result, the game system 1 transitions to the initial state (see FIG. 13). Note that in the above case, while in the present example embodiment, the game system transitions to the menu state, as shown in FIG. 13, in another example embodiment, the game system 1 may transition to the first television operation state or the browser state. Moreover, in another example embodiment, when terminating an application in the interrupted state, the user may be able to select the state to which the system is transitioned from among the three initial states. In this manner, in the present example embodiment, the user can both resume and terminate the execution of an application in the interrupted state.

6. Details of the Processing in the Game System

Figure 14:
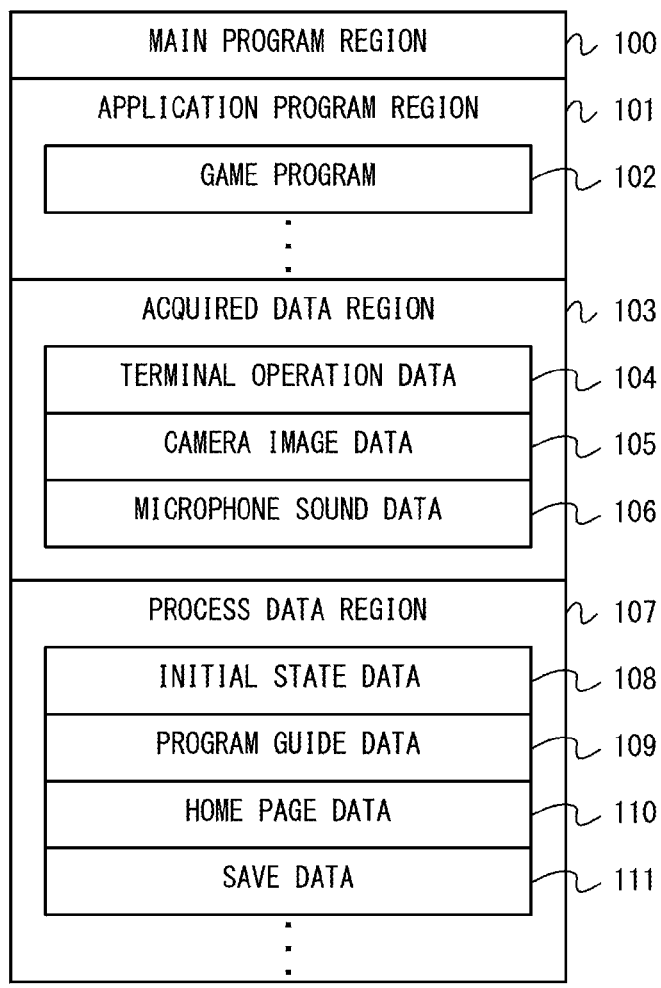
FIG. 14 is a diagram illustrating an example storage area of a main memory in the game apparatus.

Next, the information processing executed in the present game system will be described in detail. First, various data for use in the information processing will be described. FIG. 14 is a diagram illustrating a storage area of the main memory (the external main memory 12 or the internal main memory 11e) in the game apparatus 3. As shown in FIG. 14, the main memory of the game apparatus 3 has provided therein a main program region 100, an application program region 101, an acquired data region 103, and a process data region 107. Note that in addition to the data shown in FIG. 14, the main memory has stored therein data, such as image data and sound data, to be used in the information processing. Moreover, the storage area shown in FIG. 14 may be provided in part in another storage device (e.g., the flash memory 17) accessible by the game apparatus 3.

The main program region 100 has stored therein a main program for managing transitions between the aforementioned states in the game system 1. In the present example embodiment, the CPU 10 executes the main program, thereby performing each step in the flowchart shown in FIG. 15 and other flowcharts. The main program is a program for performing processes to be described later, including a menu process, a television process, a browser process, and an interruption-time process, but in another example embodiment, individual programs for performing these processes respectively may be separately stored in the main memory. The main program is read in whole or in part from a predetermined storage device at an appropriate time after the power-on of the game apparatus 3, and then stored to the main memory. Note that the predetermined storage device may be any storage accessible by the game apparatus 3, and it is the flash memory 17 in the present example embodiment. Moreover, the main program may be acquired from the optical disc 4 or a device external to the game apparatus 3 (e.g., via the Internet), rather than from the flash memory 17.

The application program region 101 is intended for storage of various applications (programs) executable by the game apparatus 3. The application program region 101 has one or more applications stored therein, and in the present example embodiment, the one or more applications include a game program 102. The game program 102 is read in whole or in part from the optical disc 4 at an appropriate time after the power-on of the game apparatus 3, and then stored to the main memory. Note that the game program 102 may be acquired from the flash memory 17 or a device external to the game apparatus 3 (e.g., via the Internet), rather than from the optical disc 4. Note that any other application to be included in the application program region 101 may be acquired from an arbitrary storage accessible by the game apparatus 3, as in the case of the game program 102.

The acquired data region 103 is intended for storage of various data acquired from the terminal device 7, etc., by the game apparatus 3. In the present example embodiment, the acquired data region 103 is used for storing terminal operation data 104, camera image data 105, and microphone sound data 106. Note that in addition to the data shown in FIG. 14, the acquired data region 103 may have stored therein, for example, controller operation data acquired from the controller 5.

The terminal operation data 104 is data representing the player's operation on the terminal device 7. The terminal operation data 104 is transmitted by the terminal device 7, acquired by the game apparatus 3, and then stored to the main memory. Note that the game apparatus 3 is capable of communicating with a plurality of terminal devices, and acquiring operation data from each of the terminal devices. In the case where there are a plurality of terminal devices, terminal operation data transmitted by each of the terminal devices is individually stored to the main memory. The main memory may have the terminal operation data stored for each terminal device up to a predetermined number of pieces counted from the latest piece (the last acquired piece).

The terminal operation data 104 includes angular rate data, acceleration data, operation button data, stick data, touch position data, and azimuth data. The angular rate data is data representing angular rates detected by the gyroscope 74. In the present example embodiment, the angular rate data represents angular rates about three axes, x-, y-, and z-axes, shown in FIG. 8, but in another example embodiment, the data may represent an angular rate about each of any one or more axes. The acceleration data is data representing acceleration (acceleration vector) detected by the acceleration sensor 73. In the present example embodiment, the acceleration data represents three-dimensional acceleration whose components are acceleration values associated with the directions of three axes, x-, y-, and z-axes, shown in FIG. 9, but in another example embodiment, the data may represent acceleration associated with any one or more directions. The gyroscope 74 and the acceleration sensor 73 are example inertial sensors. The game apparatus 3 can calculate the attitude of the terminal device 7 on the basis of the results of detection by the inertial sensors (angular rate data and acceleration data).

Furthermore, the operation button data is data representing an input state of each of the operation buttons 54A to 54L provided on the terminal device 7. Specifically, the operation button data indicates whether any of the operation buttons 54A to 54L has been pressed. The stick data is data representing the direction and the amount of sliding (or tilting) of the stick portion of each of the analog sticks 53A and 53B. The amount and the direction may be represented by, for example, two-dimensional coordinates or a two-dimensional vector. The touch position data is data representing a position (touch position) on the input screen of the touch panel 52 at which an input has been made. In the present example embodiment, the touch position data represents a coordinate value in a two-dimensional coordinate system which indicates a position on the input screen. Note that in the case where the touch panel 52 is multi-touch, the touch position data may represent a plurality of touch positions. The azimuth data is data representing an azimuth detected by the magnetic sensor 72. In the present example embodiment, the azimuth data represents a predetermined azimuth (e.g., north) with respect to the terminal device 7. Note that in a place where there is a magnetic field in addition to the geomagnetic field, the azimuth data does not strictly indicate an absolute azimuth (such as north). However, the azimuth data indicates the direction of the terminal device 7 relative to the direction of the magnetic field in the place, and therefore, even in the case as above, it is possible to calculate the attitude or the change in the attitude of the terminal device 7 based on the azimuth data.

Note that the terminal operation data 104 may only include any one of the aforementioned data so long as an operation on the terminal device 7 is represented. In addition, in the case where the terminal device 7 has another input means (e.g., a touch pad, or an imaging means as provided in the controller 5), the terminal operation data 104 may include data representing an operation on such an input means. Note that in the case where the motion of the terminal device 7 itself is used as a game operation as in the present example embodiment, the terminal operation data 104 may include data representing information related to the motion of the terminal device 7 (data whose value changes in accordance with the motion), as in the case of the acceleration data, the angular rate data, and the azimuth data. For example, the information related to the motion of the terminal device 7 is information concerning the position, attitude, change in position (speed), change in attitude (angular rate), acceleration, and angular acceleration of the terminal device 7.

The camera image data 105 is data representing an image (pickup image) obtained by the camera 56 of the terminal device 7. The camera image data 105 is image data obtained by the codec LSI 27 decompressing compressed image data transmitted by the terminal device 7, and the input/output processor 11*a* stores the camera image data 105 to the main memory. The microphone sound data 106 is data representing sound (microphone sound) detected by the microphone 79 of the terminal device 7. The microphone sound data 106 is obtained by the codec LSI 27 decompressing compressed sound data transmitted by the terminal device 7, and the input/output processor 11*a* stores the microphone sound data 106 to the main memory.

The process data region 107 is intended for storage of various data to be used in the information processing (such as that shown in FIG. 15) by the game apparatus 3. In the present example embodiment, the process data region 107 stores initial state data 108, program guide data 109, home page data 110, save data 111, and so on. Note that in addition to the data shown in FIG. 14, the process data region 107 has stored therein various data for use in executing applications.

The initial state data 108 is data representing an initial state of the game system 1 immediately after boot, the initial state being one of the three initial states. The initial state data 108 may be set arbitrarily, but in the present example embodiment, the initial state is determined in accordance with the final state of the game system 1 upon the last shutdown (power-off or sleep).

The program guide data 109 is data for use in generating a television program guide to be displayed on the terminal device 7 upon transition to the first television operation state. In the present example embodiment, data for a program guide is acquired in a timely manner from a predetermined server via the network 90, and stored to the main memory as program guide data 109. In the present example embodiment, when the game system 1 transitions to the first television operation state, the terminal device 7 initially displays a program guide generated on the basis of the program guide data 109.

The home page data 110 is data for use in generating a home page (a Web page displayed at the start of the browser function) to be displayed on the terminal device 7 upon transition to the browser state. In the present example embodiment, data for a preset home page is acquired in a timely manner from a predetermined server via the network 90, and stored to the main memory as home page data 110. In the present example embodiment, when the game system 1 transitions to the browser state, the terminal device 7 initially displays a Web page image generated on the basis of the home page data 110.

The save data 111 is application save data for the game program 102 and so on. As will be described in detail later, when the execution of an application is terminated, data representing the content of the game and game parameters for resuming the game is stored to the main memory as save data 111.

Figure 15:
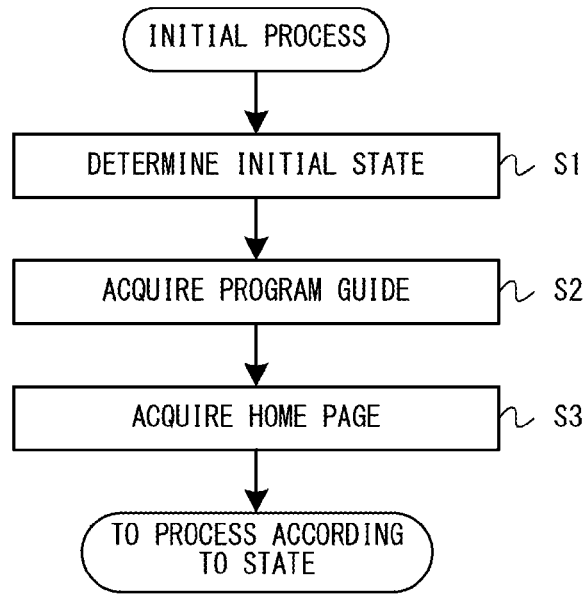
FIG. 15 is a flowchart illustrating an example flow of an initial process performed by the game apparatus.

Next, a flow of the information processing to be executed by the game system 1 (game apparatus 3) will be described in detail with reference to FIGS. 15 to 24. FIG. 15 is a flowchart illustrating a flow of an initial process performed by the game apparatus 3. The initial process is a process to be performed in response to boot of the game system (game apparatus 3). Specifically, when the game apparatus 3 is powered on, the CPU 10 of the game apparatus 3 executes a boot program stored in an unillustrated boot ROM, thereby initializing each unit, including the main memory. A main program stored in the flash memory 17 is loaded to the main memory, and the CPU 10 starts executing the main program. The processing shown in the flowchart of FIG. 15 is performed upon completion of the above processing.

Note that the processing in each step of the flowcharts shown in the figures is merely illustrative, and if similar results can be achieved, the processing order of the steps may be changed. In addition, values of variables and thresholds to be used in determination steps are also merely illustrative, and other values may be used appropriately. Furthermore, while the processing in each step of the flowcharts is described herein as being executed by the CPU 10, the processing in the steps of the flowcharts may be performed in part by a processor other than the CPU 10 or by specialized circuits.

First, in step S1, the CPU 10 sets one of the three states (menu state, first television operation state, and browser state) as the first initial state to be taken. Here, the initial state may be set arbitrarily, and in the present example embodiment, the initial state upon the next boot is set on the basis of the final state of the game system 1 upon the last shutdown. Specifically, when the game system 1 is shut down (powered off or brought into sleep mode), data representing the state at that time is stored to the flash memory 17. Then, in step S1, the CPU 10 reads that data from the flash memory 17, and sets the initial state on the basis of the state represented by the data. Concretely, when the data represents any one of the three initial states, the state represented by the data is set as the initial state. Alternatively, when the data represents the app execution state or the interrupted state, the menu state is set as the initial state. Data representing the initial state thus set is stored to the main memory as initial state data. In this manner, in the present example embodiment, the state of the game system 1 upon the last shutdown is set as the initial state, and therefore, the last user of the game system 1 can restart using the game system 1 in an appropriate state. Following step S1, the process of step S2 is performed.

Note that in another example embodiment, the initial state may be set by another method. For example, the initial state may be set to a state previously designed by the user. This also allows the user to start/restart using the game system 1 in an appropriate state, as in the present example embodiment. In addition, for example, when the game apparatus 3 is capable of identifying users, the initial state may be set to states corresponding to users of the game system 1. As a result, even when the game system 1 is used by a plurality of users, each user can start/restart using the game system 1 in an appropriate state for that user. Note that the "states corresponding to users" may be states set on the basis of the states of the game system 1 upon the last shutdown by the users or may be states designated by the users. Moreover, the method for identifying users may be arbitrary. For example, the CPU 10 may identify users by prompting the users to enter their IDs and/or passwords upon boot. Alternatively, for example, the CPU 10 may identify users by using images of their faces taken by the camera 56 of the terminal device 7. Concretely, it is possible to identify the users by registering the images of the users' faces in advance and comparing the images taken by the camera 56 to the registered images.

In steps S2 and S3, program guide data and home page data are acquired in advance. Here, these data may be acquired at any arbitrary time, and in the present example embodiment, they are acquired upon boot of the game system 1. Note that in another example embodiment, these data may be acquired at the time of transition to a state where a program guide or a home page is to be displayed (i.e., the first television operation state or the browser state). In addition, as the home page data, data acquired in the previous use of the game system 1 may be saved using the cache function of a general browser.

In step S2, the CPU 10 acquires a program guide from a predetermined server (external device 91) via the network 90. Specifically, the CPU 10 first generates an acquisition request for the program guide, and transmits the acquisition request to the server via the network 90. The server may be any server capable of providing program guide data, e.g., a Web server having program guide data stored therein. In response to the acquisition request, the server transmits program guide data to the game apparatus 3 via the network 90. The program guide data transmitted from the server is stored to the flash memory 17 (or the main memory). Note that in another example embodiment, program guide image data generated from the data acquired from the server may be stored instead as program guide data 109. Following step S2, the process of step S3 is performed.

In step S3, the CPU 10 acquires data for a Web page (home page) to be accessed at the start of the browser function.

Specifically, the CPU 10 first generates an acquisition request for the Web page, and transmits the acquisition request to the predetermined server via the network 90. The server may be any information processing apparatus capable of providing a preset Web page as mentioned above. In response to the acquisition request, the server transmits Web page data to the game apparatus 3 via the network 90. The Web page data transmitted from the server is stored to the flash memory 17 (or the main memory). Note that in another example embodiment, Web page image data generated from the data acquired from the server may be stored instead as home page data 110. The CPU 10 ends the initial process after step S3.

After the initial process, a process in accordance with the initial state set in step S1 is executed. Specifically, a menu process to be described later is executed when the initial state is the menu state, a television process to be described later is executed when the initial state is the first television operation state, and a browser process to be described later is executed when the initial state is the browser state. Hereinafter, the menu process, the television process, and the browser process will be described in detail.

(Menu Process)

Figure 16:
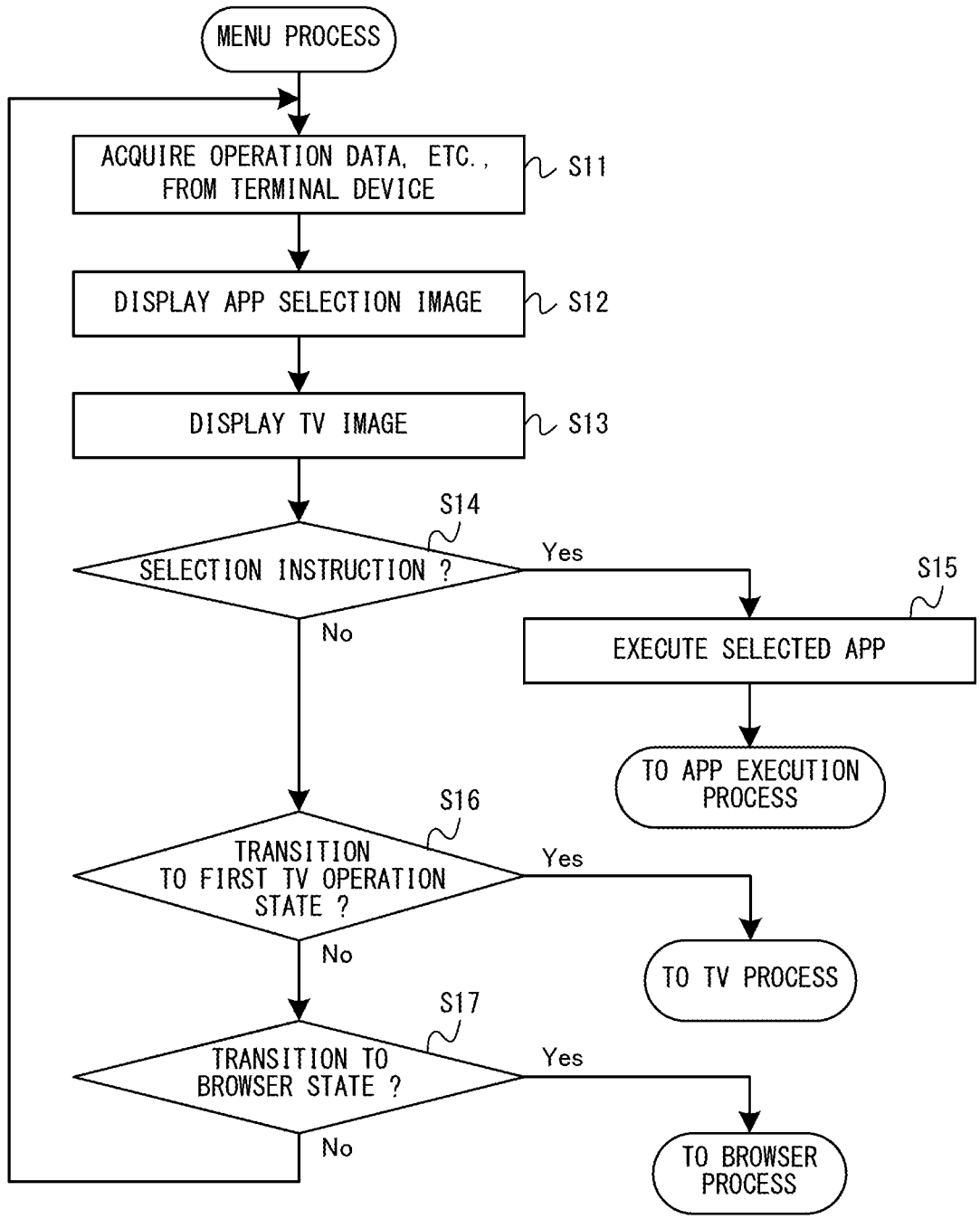
FIG. 16 is a flowchart illustrating an example flow of a menu process performed by the game apparatus.

FIG. 16 is a flowchart illustrating a flow of the menu process performed by the game apparatus 3. First, in step S11, the CPU 10 acquires various data from the terminal device 7. Here, at least terminal operation data is acquired from the terminal device 7, and in the present example embodiment, camera image data and microphone sound data are further acquired. The terminal device 7 repeatedly transmits these data (terminal operation data, camera image data, and microphone sound data) to the game apparatus 3, and the game apparatus 3 sequentially receives the data. In the game apparatus 3, the terminal communication module 28 sequentially receives the data, and the codec LSI 27 sequentially subjects the camera image data and the microphone sound data to decompressing processing. Then, the input/output processor 11a sequentially stores the terminal operation data, the camera image data, and the microphone sound data to the main memory. The CPU 10 reads these data at appropriate times. Following step S11, the process of step S12 is performed.

In step S12, the CPU 10 displays an app selection image on the terminal device 7. Specifically, the CPU 10 generates an app selection image, and outputs (transmits) the generated app selection image to the terminal device 7. The app selection image may be any image which allows the user to select an application executable by the game apparatus 3. Hereinafter, with reference to FIG. 17, the app selection image in the present example embodiment will be described.

Figure 17:
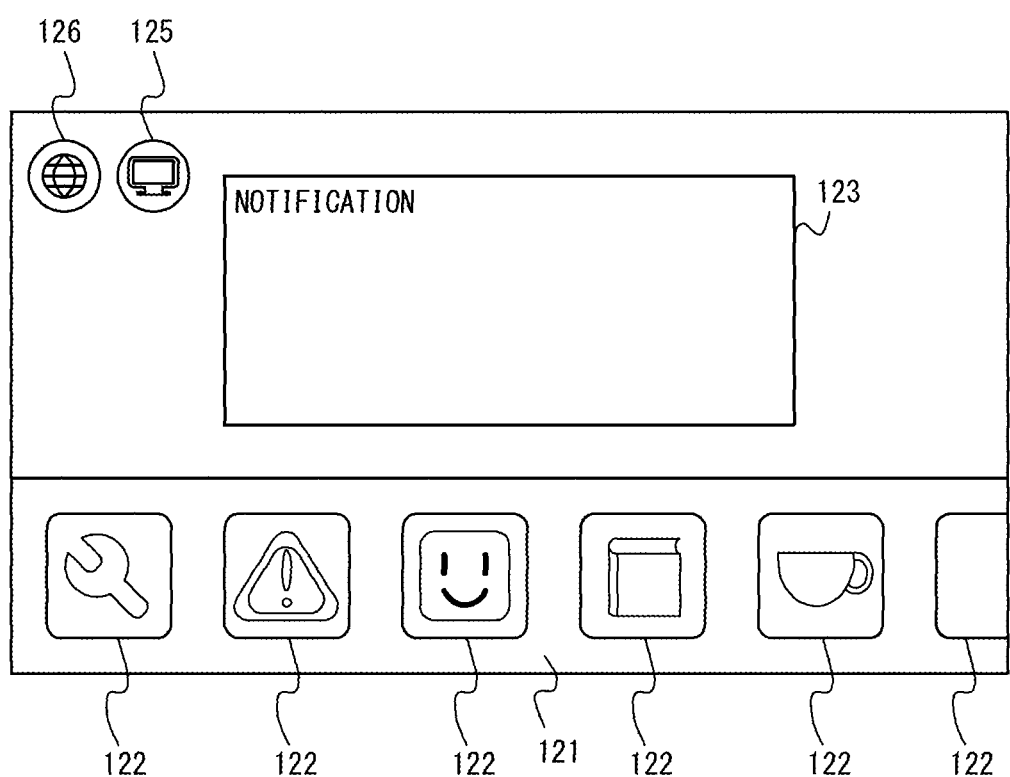
FIG. 17 is a diagram illustrating an example app selection image displayed on the terminal device.

FIG. 17 is a diagram illustrating an example app selection image displayed on the terminal device 7. As shown in FIG. 17, the app selection image includes an app area 121, a notification area 123, a television icon 125, and a browser icon 126. The app selection image shown in FIG. 17 is a menu image for selecting an application to be executed by the game apparatus 3.

In FIG. 17, the app area 121 is an area in which one or more app icons 122 are displayed. The app icon 122 is an image (icon) representing an application executable by the game apparatus 3. In the present example embodiment, by an operation of selecting the app icon 122, the application represented by the app icon 122 is executed. Note that in FIG. 17, the app area 121 can be horizontally scrolled in accordance with a predetermined scrolling operation, and horizontal scrolling changes the app icon 122 to be displayed. The notification area 123 is an area in which a notification to the user is displayed. The notification area 123 may display any information, including, for example, presentation of a new application, and notifications about various services related to the game system 1. Note that the game apparatus 3 may access a predetermined server via the network 90 at an appropriate time and acquire notification information, thereby updating the contents of the notification.

The television icon 125 is an image representing an instruction to transition to the first television operation state. As will be described in detail later, in the present example embodiment, by an operation of selecting the television icon 125 (a change operation as described above), the game system 1 is caused to transition to the first television operation state. The browser icon 126 is an image representing an instruction to transition to the browser state. As will be described in detail later, in the present example embodiment, by an operation of selecting the browser icon 126 (a change operation as described above), the game system 1 is caused to transition to the browser state. Specifically, in the menu state, by performing an operation to select the television icon 125 or the browser icon 126, the user can readily cause the game system 1 to transition to the first television operation state or the browser state.

In step S12, the CPU 10 and the GPU 11b collaborate to read data, including image data for various icons, which is used for generating an app selection image, from the VRAM 11d, the data being read is used to generate the app selection image. The generated app selection image is stored to the VRAM 11d. Moreover, the CPU 10 outputs the app selection image to the terminal device 7. Concretely, the CPU 10 transfers data for the app selection image stored in the VRAM 11d to the codec LSI 27, and the codec LSI 27 subjects the data to predetermined compression processing. The terminal communication module 28 transmits the compressed image data to the terminal device 7 via the antenna 29. In the terminal device 7, the wireless module 80 receives the image data transmitted by the game apparatus 3, and the codec LSI 76 performs predetermined decompressing processing on the received image data. The decompressed image data is outputted to the LCD 51. As a result, the app selection image is displayed on the LCD 51. Moreover, in step S12, sound data may be transmitted to the terminal device 7 along with the image data, so that the speakers 77 of the terminal device 7 output sound. Following step S12, the process of step S13 is performed.

In step S13, a television image is displayed on the television 2. Specifically, the CPU 10 generates a predetermined television image, and outputs the generated television image to the television 2. The content of the television image to be displayed in the menu state may be arbitrary. For example, the television image may be an image related to an application executable by the game apparatus 3 (e.g., a title image or demonstration video of a game application) or may be an image to be displayed in the notification area 123. Note that it is envisioned that, in the menu state, the television 2 is used for a purpose other than in the game system 1 (e.g., to display a television program), and therefore, the content of the television image may be intended for auxiliary use.

In step S13, the CPU 10 and the GPU 11b collaborate to read data for use in television image generation from the VRAM 11d, and generate a television image. The generated television image is stored to the VRAM 11d. In addition, the CPU 10 outputs the television image to the television 2. Concretely, the CPU 10 transfers television image data stored in the VRAM 11d to the AV-IC 15. In response to this, the AV-IC 15 outputs the television image data to the television 2 via the AV connector 16. As a result, the television image is displayed on the television 2. Moreover, in step S13, sound data may be outputted to the television 2 along with the image data, so that sound is outputted from the speakers 2*a* of the television 2. Following step S13, the process of step S14 is performed.

In step S14, the CPU 10 determines whether or not a selection instruction has been provided. The selection instruction is an instruction to select an application to be executed. The selection instruction may be provided by any operation, and in the present example embodiment, the selection instruction is provided by an operation of touching an app icon 122 displayed on the terminal device 7. Specifically, the CPU 10 reads touch data in the terminal operation data 104 from the main memory, and determines whether or not any app icon 122 displayed on the terminal device 7 has been touched, on the basis of the touch data. Note that in another example embodiment, for example, the selection instruction may be provided using a cursor displayed on the terminal device 7. Specifically, the CPU 10 may determine that an app icon 122 has been selected when a predetermined operation was performed with the cursor being placed on the app icon 122 after having been moved in accordance with a direction input operation on the terminal device 7 (e.g., a direction input operation with the analog stick 53). When the result of the determination of step S14 is affirmative, the process of step S15 is performed. On the other hand, when the result of the determination of step S14 is negative, the process of step S16 is performed.

In step S15, the CPU 10 executes the application selected by the selection instruction. Specifically, the CPU 10 reads the selected application from a storage (e.g., the optical disc 4 or the flash memory 17) having the application stored therein, and then stores the application to the main memory. Thereafter, the execution of the application stored in the main memory is started. After step S15, the CPU 10 ends the menu process, and executes an app execution process. As a result, the game system 1 transitions to the app execution state.

Although not shown, information processing in accordance with the application is executed in the app execution process. The content of the application to be executed may be arbitrary, and information processing to be performed by executing the application may also be arbitrary. The CPU 10 outputs an image generated by executing the application to either the terminal device 7 or the television 2, or both. Note that a determination as to whether to display the generated image on either the terminal device 7 or the television 2, or both, may be made arbitrarily. For example, the determination may be made by the application or the user. When the generated image is displayed only on the terminal device 7, the television 2 can display a television program, so that the user can use the application on the game system 1 while viewing the television program.

On the other hand, in step S16, the CPU 10 determines whether or not to transition to the first television operation state. Specifically, the CPU 10 determines whether or not a change operation has been performed to transition from the menu state to the first television operation state. The change operation may be any operation, and in the present example embodiment, it is an operation of touching the television icon 125 displayed on the terminal device 7. Specifically, the CPU 10 reads the touch data in the terminal operation data 104 from the main memory, and determines whether or not the television icon 125 displayed on the terminal device 7 has been touched, on the basis of the touch data. When the result of the determination of step S16 is affirmative, the CPU 10 ends the menu process, and performs a television process to be described later. On the other hand, when the result of the determination of step S16 is negative, the process of step S17 is performed.

Note that in the present example embodiment, various instructions (operations) in, for example, steps S14, S16, S17, S23, S25, S26, S33, S34, S43, S45, S47, S50, and S52 are provided using the touch panel 52. Specifically, the CPU 10 (in concert with the GPU 11*b*) can generate images representing various instructions (e.g., the selection instruction, the control instruction, and instructions for the change operations), and can output and display the images on the terminal device 7. Furthermore, when such an image is selected (touched) on the touch panel 52, an instruction as mentioned above is determined to have been provided. Thus, the user can provide various instructions by easy and intuitive operations using the touch panel.

Note that in another example embodiment, various instructions may be provided by other operations. For example, the instructions may be provided in whole or in part by operations using the cursor displayed on the terminal device 7. Specifically, predetermined instructions may be provided by performing predetermined operations with the cursor being placed on images (e.g., icons) representing the instructions after having been moved in accordance with a direction input operation on the terminal device 7. Alternatively, for example, the instructions may be provided in whole or in part by operations of pressing any of the buttons 54A to 54M of the terminal device 7. More specifically, an instruction (the change operation as mentioned above) to transition from one state to another of the three initial states may be provided by an operation of pressing predetermined buttons (e.g., the second L button 54K and the second R button 54L) of the terminal device 7. Specifically, each pressing of a predetermined button of the terminal device 7 changes the app selection image, the device control image, and the browser image one by one in sequence. Alternatively, for example, the instructions may be provided in whole or in part by operations of moving the terminal device 7. Note that the movement of the terminal device 7 can be calculated (estimated) using the results of detection by the inertial sensors (the acceleration sensor 73 and the gyroscope 74) and the magnetic sensor 72.

In step S17, the CPU 10 determines whether to transition to the browser state. Concretely, the CPU 10 determines whether or not a display instruction to display a Web page has been provided, i.e., a change operation to transition from the menu state to the browser state has been performed. The change operation may be any operation, and in the present example embodiment, it is an operation of touching the browser icon 126 displayed on the terminal device 7. Specifically, the CPU 10 reads the touch data in the terminal operation data 104 from the main memory, and determines whether or not the browser icon 126 displayed on the terminal device 7 has been touched, on the basis of the touch data. When the result of the determination of step S17 is affirmative, the CPU 10 ends the menu process, and performs the browser process to be described later. On the other hand, when the result of the determination of step S17 is negative, the process of step S11 is performed again. Thereafter, until the result of the determination of step S14, S16, or S17 turns out to be affirmative, the menu process is repeatedly performed.

(Television Process)

Figure 18:
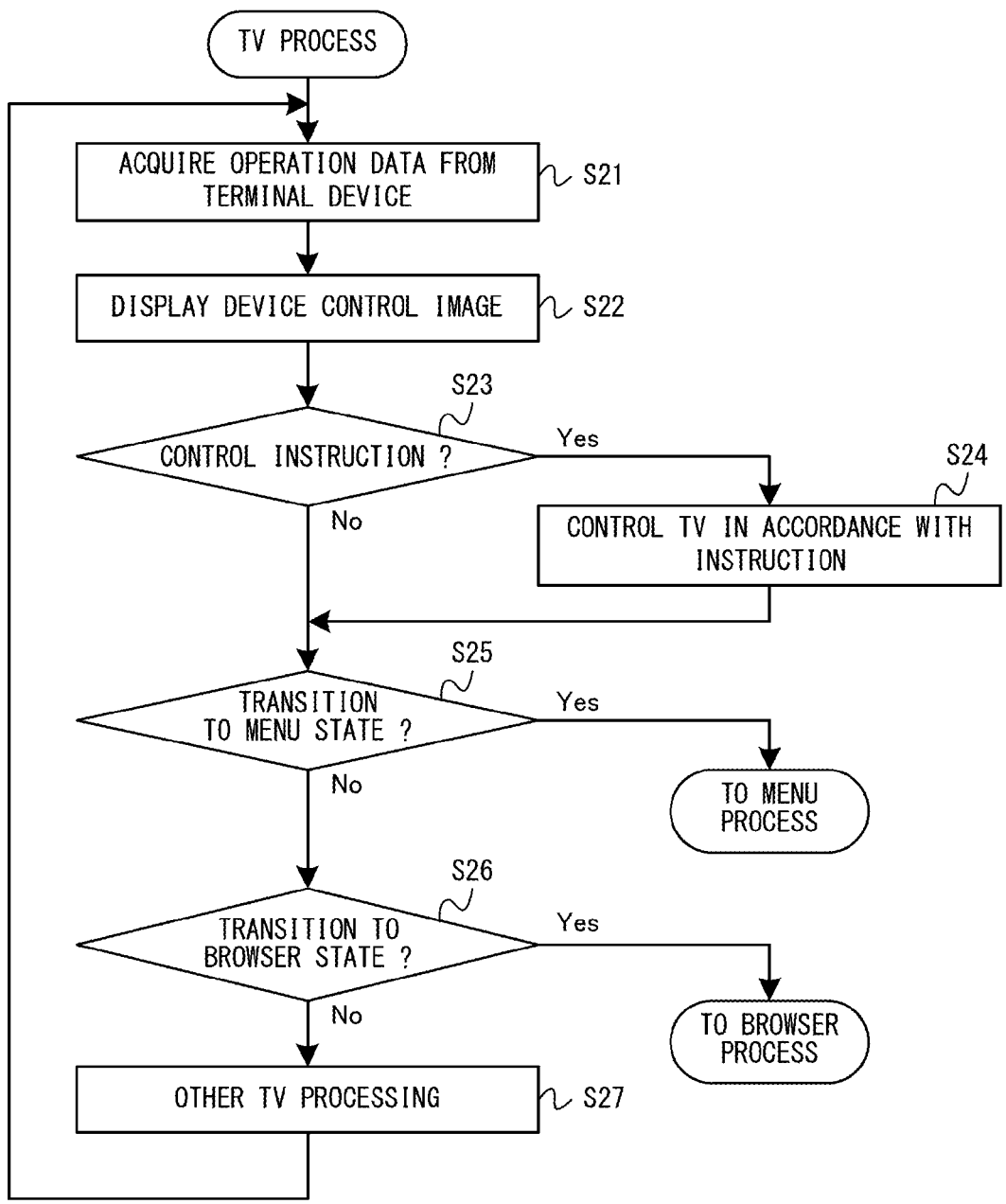
FIG. 18 is a flowchart illustrating an example flow of a television process performed by the game apparatus 3.

FIG. 18 is a flowchart illustrating a flow of the television process performed by the game apparatus 3. The television process is performed when the first television operation state is determined as the initial state or when a change operation to transition from the menu state or the browser state to the first television operation state is performed. First, in step S21, the CPU 10 acquires various data from the terminal device 7. The process of step S21 is the same as that of step S11. Following step S21, the process of step S22 is performed.

In step S22, the CPU 10 displays a device control image on the terminal device 7. Specifically, the CPU 10 generates a device control image, and outputs (transmits) the generated device control image to the terminal device 7. The device control image may be any operation image representing an operation on the television 2. In the present example embodiment, a television program guide image is acquired from the external device 91 via the network 90, and displayed as the device control image. Hereinafter, referring to FIG. 19, the device control image in the present example embodiment will be described.

Figure 19:
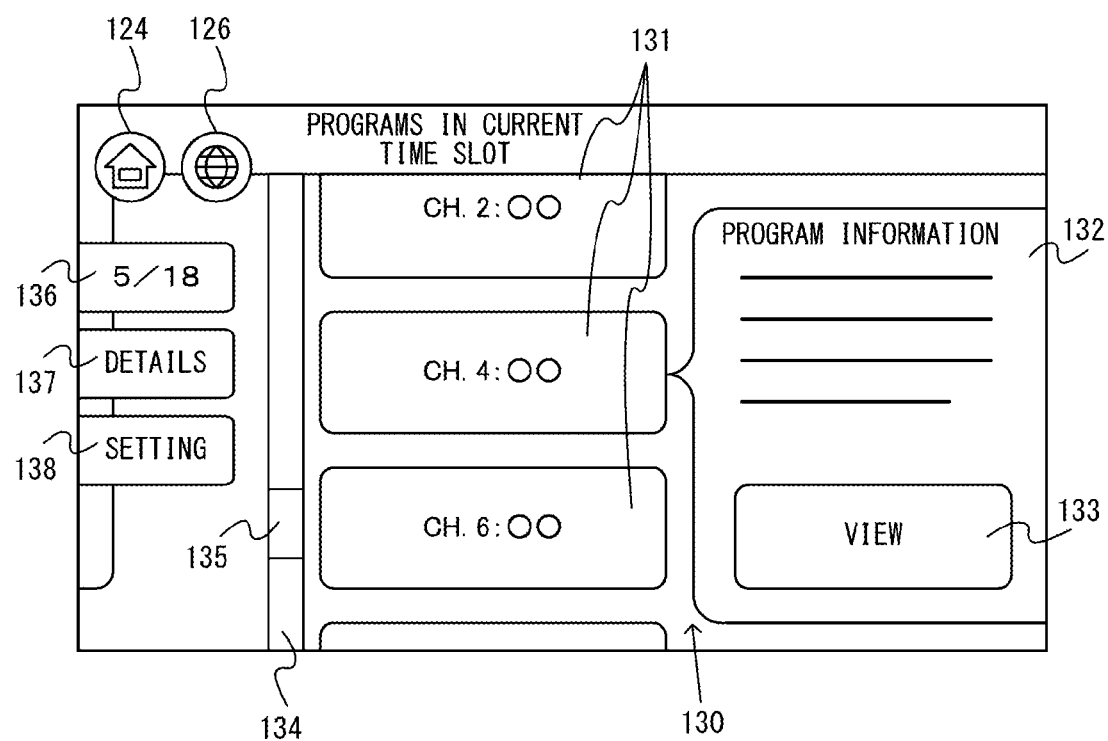
FIG. 19 is a diagram illustrating an example device control image displayed on the terminal device.

FIG. 19 is a diagram illustrating an example device control image displayed on the terminal device 7. As shown in FIG. 19, the device control image includes a program guide area 130, operation button images 136 to 138, a menu icon 124, and the browser icon 126. The device control image shown in FIG. 19 is a program guide image, including images representing control instructions to the television 2.

In FIG. 19, the program guide area 130 is an area in which to display a program guide generated on the basis of data acquired from a predetermined server via the network 90. Here, the program guide area 130 includes channel images 131, a program information area 132, a tuning instruction button 133, a scrollbar 134, a date operation button 136, a detail display button 137, and a setting button 138. The channel images 131 are images representing television channels and program names. In FIG. 19, the channel images 131 are vertically arranged, and the user can scroll up and down to display desired channel images 131 by moving a knob 135 of the scrollbar 134. The program information area 132 is an area in which to display information about a television program represented by any given one of the displayed channel images 131 (the information being about the content, cast, etc., of the program). Here, the given channel image 131 is a channel image 131 touched by the user.

The tuning instruction button 133 is an image representing a control instruction to the television 2, concretely, a control instruction to tune in to the channel represented by the given channel image. Note that the image representing the control instruction is not limited to the tuning instruction button 133, and for example, the device control image may include a button representing a control instruction to turn on or off the television 2, adjust the volume of the television 2, or switch between inputs to the television 2.

The date operation button 136 is a button for providing an instruction to change the date (and time) of a program guide to be displayed. The detail display button 137 is a button for providing an instruction to display more detailed information than the displayed content in the program information area 132. The setting button 138 is a button for providing an instruction to display a setting screen for program guides and the terminal device 7. Note that in addition to the above, the terminal device 7 may display, for example, an image for program guide search, and an image for displaying a list of favorite programs. By using the program guide image, the user can browse the content of television programs, and operate the television 2 to tune in to a desired channel. In the present example embodiment, the television program guide is displayed in the first television operation state, and therefore, the user can conveniently change the channel of the television 2 while viewing the program guide.

The menu icon 124 is an image representing an instruction to transition to the menu state. As will be described in detail later, in the present example embodiment, by an operation of selecting the menu icon 124 (the change operation as mentioned above), the game system 1 is caused to transition to the menu state. The browser icon 126 is the same as that shown in FIG. 16. Accordingly, in the first television operation state, by an operation of selecting the menu icon 124 or the browser icon 126, the user can readily cause the game system 1 to transition to the menu state or the browser state.

In step S22, the CPU 10 and the GPU 11b collaborate to read data for use in device control image generation from both the main memory and the VRAM 11d, and a device control image is generated using the data being read. In the present example embodiment, any image to be displayed in the program guide area 130 is generated using the program guide data 109 stored in the main memory. Accordingly, in the present example embodiment, even immediately after transition to the first television operation state, the device control image can be quickly displayed on the terminal device 7. Moreover, the generated device control image is stored to the VRAM 11d. In addition, the CPU 10 outputs the device control image to the terminal device 7. The process of outputting and displaying an image on the terminal device 7 is the same as in step S12. As a result, the device control image is displayed on the LCD 51. Moreover, in step S22, sound data may be transmitted to the terminal device 7 along with the image data, so that the speakers 77 of the terminal device 7 output sound. Following step S22, the process of step S23 is performed.

In step S23, it is determined whether or not a control instruction has been provided. The control instruction is an instruction to control the television 2. The operation for providing the control instruction may be arbitrary, and in the present example embodiment, the control instruction is provided by an operation of touching a button (tuning instruction button 133) displayed on the terminal device 7, representing the control instruction. Specifically, the CPU 10 reads the touch data in the terminal operation data 104 from the main memory, and determines whether or not the button displayed on the terminal device 7 has been touched, on the basis of the touch data. When the result of the determination of step S23 is affirmative, the process of step S24 is performed. On the other hand, when the result of the determination of step S23 is negative, the process of step S24 is skipped, and the process of step S25 is performed.

In step S24, the CPU 10 controls the television 2 in accordance with the control instruction. Here, the method for the game system 1 to control the television 2 is arbitrary. In the present example embodiment, the television 2 can be controlled by a first method in which the game apparatus 3 outputs a control signal to the television 2 via the terminal device 7, and a second method in which the game apparatus 3 outputs a control signal directly to the television 2.

In the first method, the CPU 10 instructs the terminal device 7 to transmit a control signal indicating the content of control according to the control instruction. In accordance with the instruction, the terminal device 7 outputs the control signal to control the television 2. Concretely, the CPU 10 outputs control data representing the instruction to the terminal device 7. Note that in the present example embodiment, the flash memory 17 or the main memory has stored therein data representing various control signals for causing the television 2 to perform various operations. From the various control signals, the CPU 10 chooses data representing a control signal according to the control instruction, and outputs the data to the terminal device 7 as control data. Upon reception of the control data, the terminal device 7 outputs the control signal represented by the control data. In the present example embodiment, an infrared signal is outputted as the control signal. Specifically, the codec LSI 76 of the terminal device 7 causes the infrared communication module 82 to output an infrared signal corresponding to the control signal represented by the control data. By the infrared light reception section of the television 2 receiving the infrared signal, the television 2 operates in accordance with the control instruction.

In the second method, the CPU 10 outputs a control signal indicating the content of control according to the control instruction to the television 2. Specifically, from various control signals for causing the television 2 to perform various operations, the CPU 10 chooses a control signal (e.g., an HDMI signal) according to the control instruction. The chosen control signal is outputted to the television 2 via the AV connector 16. This also causes the television 2 to operate in accordance with the control instruction.

Note that the format of the control signal (infrared signal) to control the television 2 may vary between models of the television 2. Accordingly, the game apparatus 3 may prestore control signals in formats corresponding to a plurality of models. In this case, the game apparatus 3 may select a format corresponding to the television 2 at a predetermined time (e.g., at the time of initial setting), and thereafter, use control signals in the selected format. Thus, the game apparatus 3 is compatible with a plurality of models of television.

Note that in the present example embodiment, the game apparatus 3 may control the television 2 using either or both of the two methods. Following step S24, the process of step S25 is performed.

In step S25, the CPU 10 determines whether or not to transition to the menu state. Specifically, the CPU 10 determines whether or not a change operation has been performed to transition from the first television operation state to the menu state. The change operation may be arbitrary, and in the present example embodiment, it is an operation of touching the menu icon 124 displayed on the terminal device 7. Specifically, the CPU 10 reads the touch data in the terminal operation data 104 from the main memory, and determines whether or not the menu icon 124 displayed on the terminal device 7 has been touched, on the basis of the touch data. When the result of the determination of step S25 is affirmative, the CPU 10 ends the television process, and performs the menu process. On the other hand, when the result of the determination of step S25 is negative, the process of step S26 is performed.

In step S26, the CPU 10 determines whether or not to transition to the browser state. The process of step S26 is the same as the process of step S17. When the result of the determination of step S26 is affirmative, the CPU 10 ends the television process, and performs the browser process to be described later. On the other hand, when the result of the determination of step S26 is negative, the process of step S27 is performed.

In step S27, the CPU 10 performs other television processing. The other television processing refers to processing in the television process, excluding steps S21 to S26. For example, the CPU 10 performs the processing of changing the content of display in the program guide area 130 in accordance with selection operations on the operation button image 136 to 138, or the processing of scrolling in accordance with a scrolling operation on the scrollbar 134 to display desired channel images 131. Moreover, in the present example embodiment, assuming that the television 2 is used to display a television program in the first television operation state, the CPU 10 does not generate nor output any television image in step S27. However, in another example embodiment, a television image may be generated and outputted. For example, the aforementioned device control image representing a program guide may be outputted and displayed on the television 2 as the television image. Thus, the user can browse the program guide on a larger screen.

Following step S27, the process of step S21 is performed again. Thereafter, until the result of the determination of step S25 or S26 turns out to be affirmative, the television process is repeatedly performed.

The television process allows the user to browse a program guide by the terminal device 7 (step S22), and perform operations on the television 2 (steps S23 and S24). In addition, by a change operation, the user can readily cause the first television operation state to transition to the menu state or the browser state (step S25 or S26).

Note that in another example embodiment, upon transition from the menu state or the browser state to the first television operation state, inputs to the television 2 may be switched (so that a television broadcast is displayed). Specifically, when the television 2 can be switched between a first mode in which images inputted from the game apparatus 3 are displayed and a second mode in which television broadcast images are displayed, the CPU 10 may control the television 2 to change its mode to the second mode in accordance with the display of the terminal device 7 switching from the app selection image (or the browser image) to the device control image. Concretely, at the start of the television process, the CPU 10 may perform input switching control of the television 2 such that the television 2 is set to the second mode to display a television broadcast. As a result, upon transition to the first television operation state, the user does not perform any operation to switch between inputs to the television 2, resulting in more simplified user operations. Note that the input switching control may be performed by either the first or second method described in conjunction with step S24.

Furthermore, in another example embodiment, upon transition from the first television operation state to the menu state or the browser state, inputs to the television 2 may be switched (so that images from the game apparatus 3 are displayed). Specifically, when the television 2 can be switched between the first mode in which images inputted from the game apparatus 3 are displayed and the second mode in which television broadcast images are displayed, the CPU 10 may control the television 2 to change its mode to the first mode in accordance with the display of the terminal device 7 switching from the device control image to the app selection image (or the browser image). Concretely, when the result of the determination of step S16 is affirmative, the CPU 10 may perform input switching control of the television 2 such that the television 2 is set to the first mode to display images from the game apparatus 3. In addition, when the result of the determination of step S17 is affirmative, the CPU 10 may similarly perform input switching control of the television 2 such that the television 2 is set to the first mode. As a result, upon transition from the first television operation state to another state, the user does not perform any operation to switch between inputs to the television 2, resulting in more simplified user operations. Note that the input switching control may be performed by either the first or second method described in conjunction with step S24.

Note that depending on the model of the television 2, it might be only possible to provide instructions to sequentially switch between a plurality of inputs (e.g., instructions to sequentially switch between five inputs numbered from "1" to "5" one at a time), and might not be possible to provide an instruction to select the second mode to display a television broadcast. In such a case, the number of input switching instructions to be provided to switch between the first mode and the second mode may be registered in advance, and the CPU 10 may provide the same number of input switching instructions as the registered number. For example, in the case where a television broadcast is displayed on "input 1", images from the game apparatus 3 are displayed on "input 3" and the number of input switching instructions to be provided to switch from "input 1" to "input 3" is two, the game apparatus 3 may store "2" as the number of input switching instructions. Note that at the initial setting of the game system 1, the user may be prompted to register an input number corresponding to the game apparatus 3, so that the game apparatus 3 can calculate the number of input switching instructions.

(Browser Process)

Figure 20:
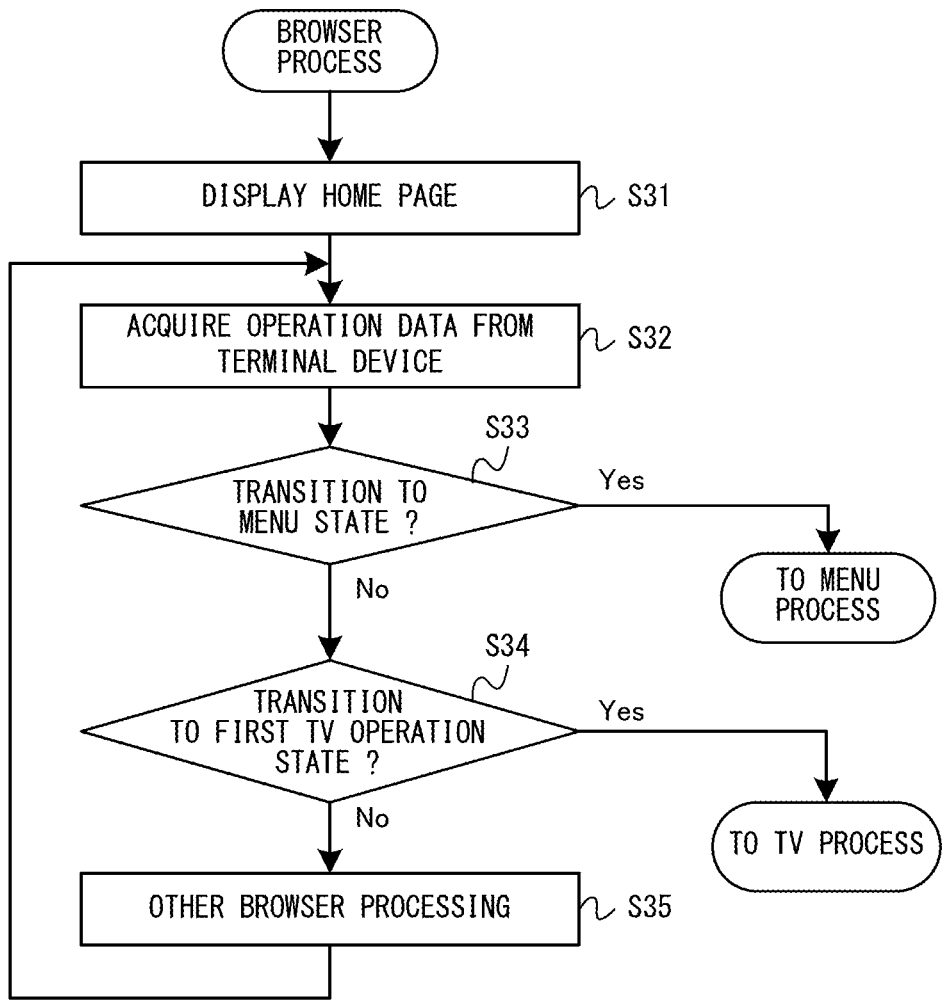
FIG. 20 is a flowchart illustrating an example flow of a browser process performed by the game apparatus.

FIG. 20 is a flowchart illustrating a flow of the browser process performed by the game apparatus 3. First, in step S21, the terminal device 7 displays a Web page image as a browser image. Specifically, the CPU 10 generates a browser image, and outputs (transmits) the generated browser image to the terminal device 7. The browser image may be any image including a Web page acquired via the network 90. Hereinafter, referring to FIG. 21, the browser image in the present example embodiment will be described.

Figure 21:
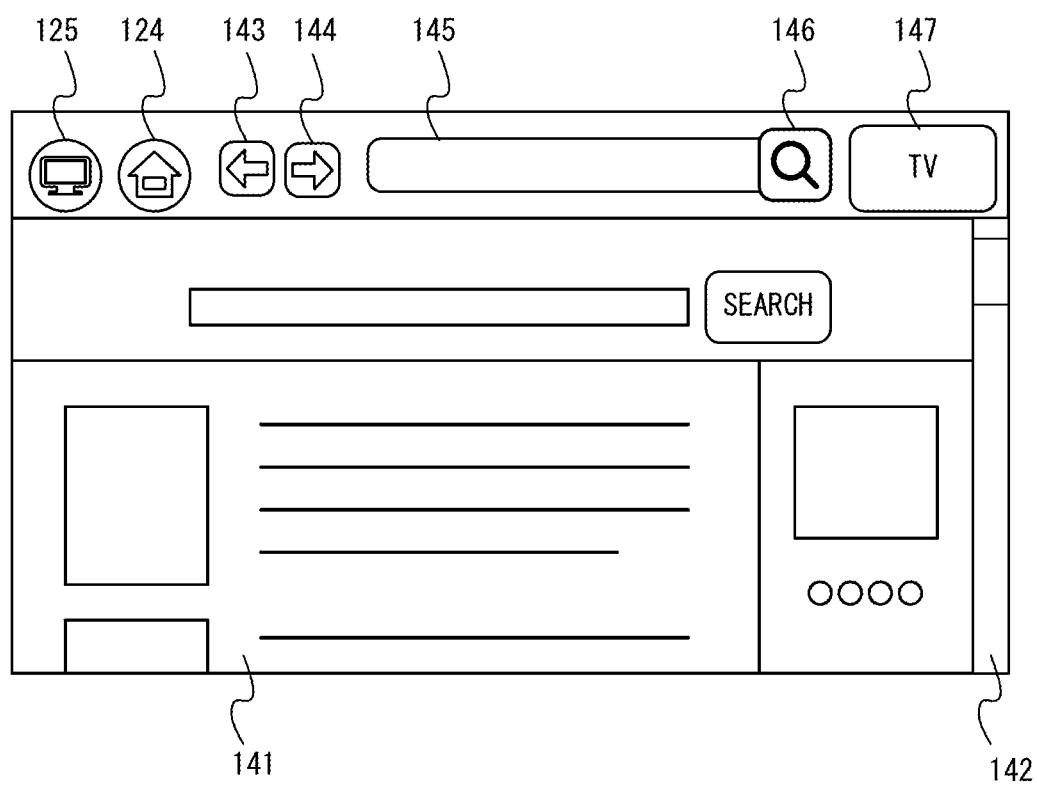
FIG. 21 is a diagram illustrating an example browser image displayed on the terminal device.

FIG. 21 is a diagram illustrating an example browser image displayed on the terminal device 7. As shown in FIG. 21, the browser image includes a Web page display area 141, a scrollbar 142, a back button 143, a forward button 144, a keyword area 145, a search button 146, and a remote control display button 147. The browser image further includes the menu icon 124 and the television icon 125. The browser image shown in FIG. 21 is an operation image for displaying a Web page and allowing operations on the Web page.

In FIG. 21, the Web page display area 141 is an area in which to display a Web page image generated on the basis of data acquired from the network 90. The Web page displayed in the Web page display area 141 can be scrolled up and down by moving a knob of the scrollbar 142 up and down. The back button 143 is an image representing an instruction to display one Web page previous to the current page. The forward button 144 is an image representing an instruction to display one Web page next to the current page. The keyword area 145 is an area in which an entered search keyword is displayed. The search button 146 is an image representing an instruction to perform a Web page search using a search keyword. The buttons 143 to 146 may function in the same manner as in conventional and general browsers.

Figure 24:
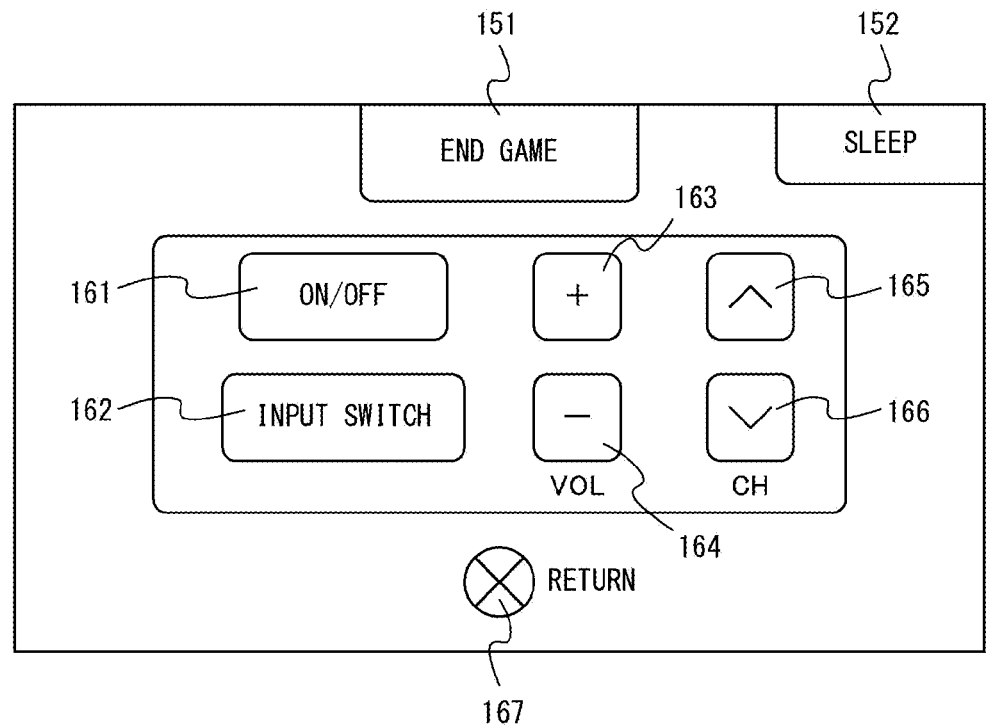
FIG. 24 is a diagram illustrating an example remote control image displayed on the terminal device.

The remote control display button 147 is an image representing an instruction to display the remote control image (FIG. 24). The remote control image will be described in detail later in conjunction with an interruption-time process. The menu icon 124 and the television icon 125 are the same as those shown in FIGS. 16 and 18. Accordingly, in the browser state, by performing an operation to select the menu icon 124 or the television icon 125, the user can readily cause the game system 1 to transition to the menu state or the first television operation state.

In step S31, the CPU 10 and the GPU 11*b* collaborate to read data for use in browser image generation from both the main memory and the VRAM 11*d*, and generate a browser image using the data being read. Note that in step S1 of the present example embodiment, any image to be displayed in the Web page display area 141 is generated using the home page data 110 stored in the main memory. Accordingly, in the present example embodiment, even immediately after transition to the browser state, the browser image can be quickly displayed on the terminal device 7. Moreover, the generated browser image is stored to the VRAM 11*d*. In addition, the CPU 10 outputs the browser image to the terminal device 7. The process of outputting and displaying an image on the terminal device 7 is the same as in step S12. As a result, the browser image is displayed on the LCD 51. Note that the CPU 10 may output at least a portion of the browser image to the terminal device 7. For example, the CPU 10 may cause the terminal device 7 to display an enlarged image of a portion of the browser image. As a result, the browser image can be displayed in a more easy-to-view format even on the terminal device 7, which generally has a smaller screen than the television 2. Moreover, in step S31, sound data may be transmitted to the terminal device 7 along with the image data, so that the speakers 77 of the terminal device 7 output sound. Following step S31, the process of step S32 is performed.

In step S32, the CPU 10 acquires various data from the terminal device 7. The process of step S32 is the same as the process of step S11. Following step S32, the process of step S33 is performed.

In step S33, the CPU 10 determines whether or not to transition to the menu state. The process of step S33 is the same as the process of step S25. When the result of the determination of step S33 is affirmative, the CPU 10 ends the browser process, and performs the menu process. On the other hand, when the result of the determination of step S33 is negative, the process of step S34 is performed.

In step S34, the CPU 10 determines whether or not to transition to the first television operation state. The process of step S34 is the same as the process of step S16. When the result of the determination of step S34 is affirmative, the CPU 10 ends the browser process, and performs the television process. On the other hand, when the result of the determination of step S34 is negative, the process of step S35 is performed.

In step S35, the CPU 10 performs other browser processing. The other browser processing refers to processing in the browser process, excluding steps S31 to S34. For example, the CPU 10 performs processing corresponding to the buttons 143 to 146 chosen by selection operations or the processing of scrolling a displayed Web page in accordance with a scrolling operation on the scrollbar 142. In addition, when a selection operation is performed on link information on a Web page in step S35, the CPU 10 performs the processing of acquiring a linked Web page or the processing of playing a video, if any, on the Web page. In step S35, various processing may be executed as in general browsers.

Furthermore, the CPU 10 may perform the processing of generating and outputting a television image to the television 2. For example, the CPU 10 may output a Web page image in whole or in part to the television 2. Concretely, a Web page displayed on the terminal device 7 includes a video, the CPU 10 may successively output images included in the video to the television 2. Thus, the user can view the video on the Web page on the television 2 having a larger screen.

Note that in the present example embodiment, the browser image is displayed at least on the terminal device 7, but the browser image may be displayed on either the terminal device 7 or the television 2, or both. When the browser image is displayed on the terminal device 7, the television 2 can be advantageously used for another purpose. In addition, when the browser image is displayed on the television 2, the browser image can be readily viewed due to a large screen of the television 2, which, for example, facilitates easy viewing of a video on a Web page displayed on the television 2. Moreover, in another example embodiment, the user may select a display device to which the browser image is outputted.

Following step S35, the process of step S32 is performed again. Thereafter, until the result of the determination of step S33 or S34 turns out to be affirmative, the browser process is repeatedly performed.

In the processes (menu process, television process, and browser process) in the initial state described above, the game apparatus 3 can generate an app selection image, a device control image, and a browser image as main operation images. The app selection image, the device control image, and the browser image are outputted to the terminal device 7 one at a time while being switched therebetween in accordance with a predetermined change operation. Thus, by change operations, the user can readily switch among any of the screen for selecting an application, the screen for viewing a program guide and operating the television, and the screen for browsing Web pages, so that the game system 1 can be used for various purposes. In the present example embodiment, while in any one of the three initial states, two icons for transitioning to the other two states are always displayed, so that, with a single operation of selecting an icon, the user can quickly cause the game system 1 to transition to a desired state. Moreover, in the present example embodiment, to view a television program by transitioning from the state for application selection or Web page browsing by using the game system 1, the user may simply perform a change operation to display a device control image on the terminal device 7 and perform a control instruction operation, so that switching operations can be readily performed using the terminal device 7.

(Interruption-Time Process)

Figure 22:
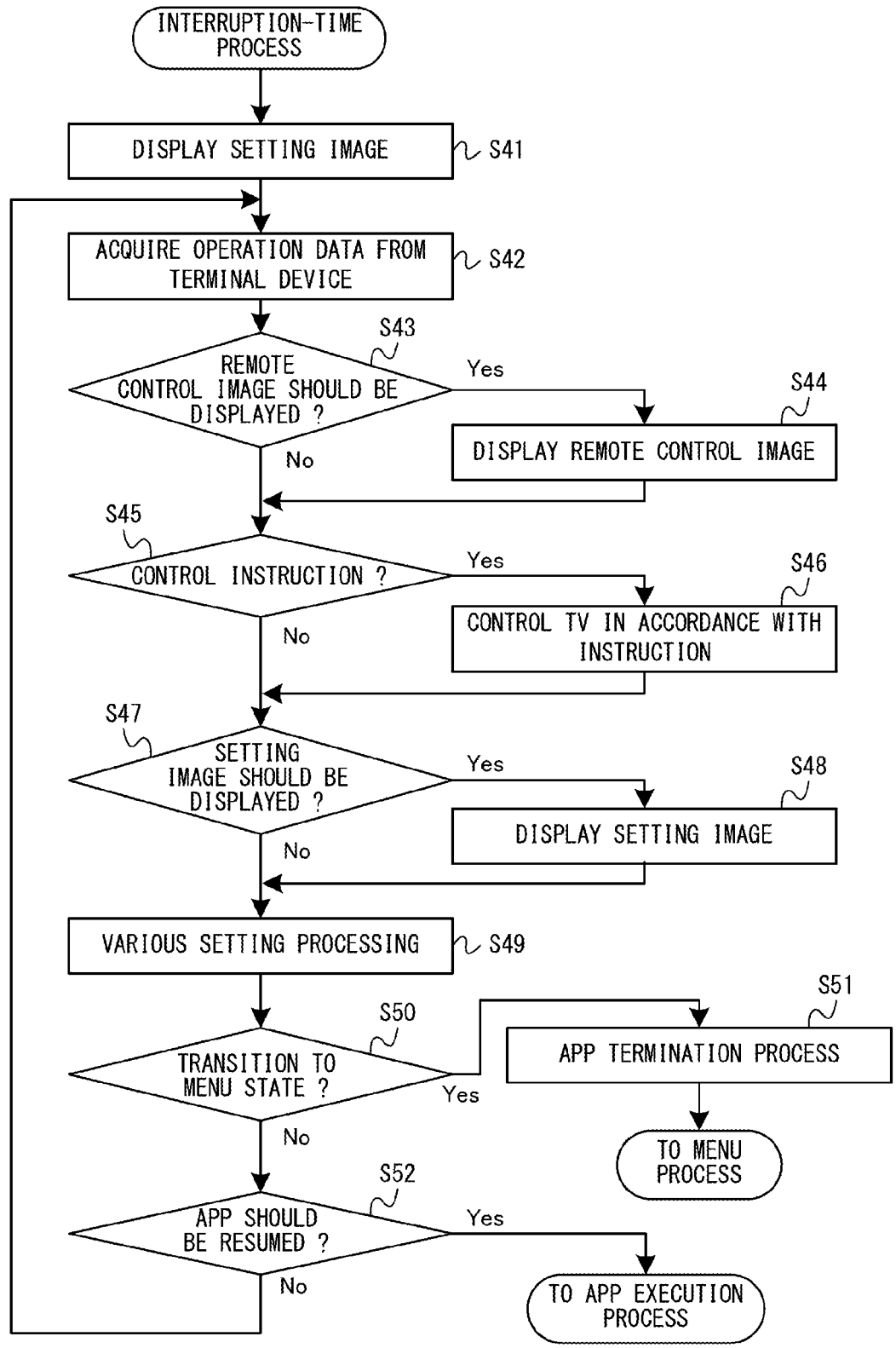
FIG. 22 is a flowchart illustrating an example flow of an app interruption process performed by the game apparatus.

Next, the interruption-time process will be described in detail. FIG. 22 is a flowchart illustrating a flow of the app interruption process performed by the game apparatus 3. In the app execution state, the app execution process is performed with its processing details according to an application. Here, when a predetermined interruption operation is performed in the app execution state, the CPU 10 interrupts (suspends) the app execution process, and performs the app interruption process shown in FIG. 22. The predetermined interruption operation may be any operation on the terminal device 7, but in the present example embodiment, it is an operation of pressing a home button 54C. Note that the home button 54C may be set to be not used for operating the application, so that the user can cause a transition to the interrupted state at any time during the execution of the application.

Note that in the present example embodiment, the execution of the application itself is interrupted (suspended) in the interrupted state. However, in another example embodiment, the execution of the application may be continued. For example, the CPU 10 may execute information processing for the application to such an extent as not to affect use by the user, including the execution of calculation for internal processing of the application.

In the app interruption process, the CPU 10 initially in step S41 displays a setting image on the terminal device 7. Specifically, the CPU 10 generates a setting image, and outputs (transmits) the generated setting image to the terminal device 7. Accordingly, in the present example embodiment, the first interrupted state to which the game system 1 transitions is the setting state. Note that in another example embodiment, the first interrupted state to which the game system 1 transitions may be the second television operation state. Moreover, the setting image may be any operation image representing a setting operation on the game system 1 (the terminal device 7). Hereinafter, referring to FIG. 23, the setting image in the present example embodiment will be described.

Figure 23:
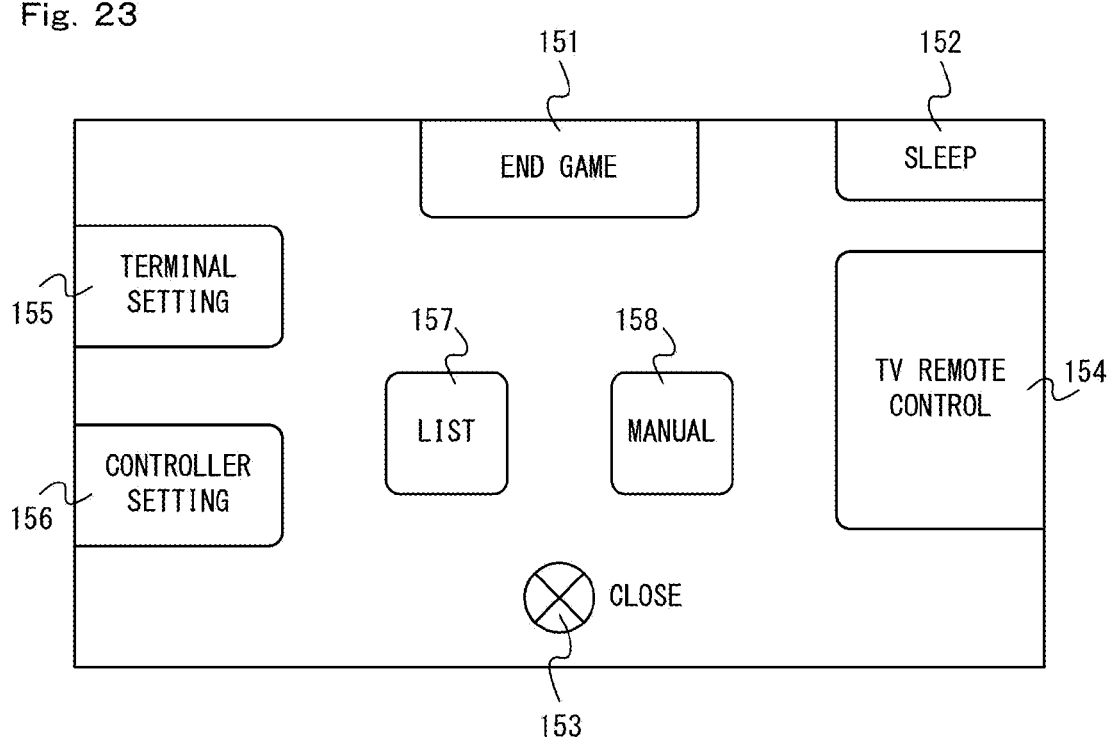
FIG. 23 is a diagram illustrating an example setting image displayed on the terminal device.

FIG. 23 is a diagram illustrating an example setting image displayed on the terminal device 7. As shown in FIG. 23, the setting image includes an app end button 151, an app suspension button 152, an app resumption button 153, a remote control display button 154, a terminal setting button 155, a controller setting button 156, a list button 157, and a manual button 158.

The app end button 151 is an image representing an instruction to terminate an application whose execution is interrupted. The app suspension button 152 is an image representing an instruction to suspend the application. The app resumption button 153 is an image representing an instruction to resume the application. With these buttons 151 to 153, it is possible to terminate or suspend the application, thereby causing a transition from the interrupted state to the menu state, or resume the application from the interrupted state.

The remote control display button 154 is an image representing an instruction to display a remote control image (FIG. 24) on the terminal device 7. As will be described in detail later, the remote control image is an operation image for operating the television 2, which includes, for example, button images representing operations on the television 2.

The terminal setting button 155 is an image representing an instruction to display a screen with which to make various settings for the terminal device 7. The controller setting button 156 is an image representing an instruction to display a screen with which to make various settings for the controller 5. The list button 157 is an image representing an instruction to display a list of other registered users (acquaintances and friends). For example, the user can play a game against or communicate with another user selected from the list. The manual button 158 is an image representing an instruction to display a manual of the game system 1 (or the terminal device 7). With these buttons 155 to 158, the user changes various settings for the game system 1.

In step S41, the CPU 10 and the GPU 11b collaborate to read data for use in generating a setting image, including, for example, images of the buttons 151 to 158, from the VRAM 11d, and generate the setting images using the data being read. Thereafter, the generated setting images are stored to the VRAM 11d. Moreover, the CPU 10 outputs the setting images to the terminal device 7. The process of outputting and displaying an image on the terminal device 7 is the same as in step S12. As a result, the setting image is displayed on the LCD 51. Moreover, in step S41, sound data may be transmitted to the terminal device 7 along with the image data, so that the speakers 77 of the terminal device 7 output sound. Following step S41, the process of step S42 is performed.

In step S42, the CPU 10 acquires various data from the terminal device 7. The process of step S42 is the same as the process of step S11. Following step S42, the process of step S43 is performed.

In step S43, the CPU 10 determines whether or not to display a remote control image. Specifically, the CPU 10 determines whether or not any operation has been performed to cause a transition from the setting state to the second television operation state. This operation may be performed in any arbitrary manner, and in the present example embodiment, it is an operation of touching the remote control display button 154 displayed on the terminal device 7. Specifically, the CPU 10 reads the touch data in the terminal operation data 104 from the main memory, and determines whether or not the remote control display button 154 displayed on the terminal device 7 has been touched, on the basis of the touch data. When the result of the determination of step S43 is affirmative, the process of step S44 is performed. On the other hand, when the result of the determination of step S43 is negative, the process of step S44 is skipped, and the process of step S45 is performed.

In step S44, the CPU 10 displays a remote control image on the terminal device 7. Specifically, the CPU 10 generates a remote control image, and outputs (transmits) the generated remote control image to the terminal device 7. The remote control image may be any operation image representing operations on the television 2. Hereinafter, referring to FIG. 24, the remote control image in the present example embodiment will be described.

FIG. 24 is a diagram illustrating an example remote control image displayed on the terminal device 7. As shown in FIG. 24, the remote control image includes the app end button 151 and the app suspension button 152 as included in the setting image. Accordingly, in the second television operation state of the present example embodiment, as in the setting state, it is possible to terminate or suspend an application and transition to the menu state. Note that in another example embodiment, for example, the CPU 10 may cause the terminal device 7 to display the app resumption button 153 as displayed in the setting image, thereby making it possible to resume an application and transition from the second television operation state to the app execution state.

Furthermore, the back button 167 is an image representing an instruction to transition (return) from the second television operation state to the setting state. Specifically, in the present example embodiment, the user can alternatingly display the setting image and the remote control image by operations of selecting the remote control display button 154 or the back button 167.

Furthermore, the remote control image includes a power button 161, an input switch button 162, a volume increment button 163, a volume decrement button 164, a channel forward button 165, and a channel back button 166. The buttons 161 to 166 are images representing instructions to control the television 2. The power button 161 is an image representing an instruction to switch on/off the television 2. The input switch button 162 is an image representing an instruction to switch between inputs to the television 2 (i.e., switch between a mode in which television program video is inputted and displayed and a mode in which images from the game apparatus 3 are inputted and displayed). The volume increment button 163 is an image representing an instruction to turn up the volume of the television 2. The volume decrement button 164 is an image representing an instruction to turn down the volume of the television 2. The channel forward button 165 is an image representing an instruction to change the channel of the television 2 one by one in ascending order. The channel back button 166 is an image representing an instruction to change the channel of the television 2 one by one in descending order. With the buttons 161 to 166, the user can operate the television 2 in terms of power on/off, input switching, volume, and channel selection. Note that in another example embodiment, in addition to the aforementioned buttons, the terminal device 7 may display buttons as provided on general television remote controls, including, for example, buttons representing channels, a button representing an instruction to display a program guide acquired from television broadcasting, and a button representing a recording instruction (when the television 2 has the recording function).

As described above, in the present example embodiment, the remote control image is an image including images representing various control instructions. Note that in another example embodiment, the remote control image may be an image representing the content of control instructions (e.g., volume increment), and assignment of the control instructions to buttons (e.g., the second R button 54L). Moreover, the remote control image may include a program guide, as in the device control image.

In step S44, the CPU 10 and the GPU 11b collaborate to read data for use in generating a remote control image, including, for example, images of the buttons 151 to 153 and 161 to 166, from the VRAM 11d, and generate a remote control image using the data being read. Thereafter, the generated remote control image is stored to the VRAM 11d. Moreover, the CPU 10 outputs the remote control image to the terminal device 7. The process of outputting and displaying an image on the terminal device 7 is the same as in step S12. As a result, the remote control image is displayed on the LCD 51. The process of step S44 causes the game system 1 to transition from the setting state to the second television operation state. Moreover, in step S44, sound data may be transmitted to the terminal device 7 along with the image data, so that the speakers 77 of the terminal device 7 output sound. Following step S44, the process of step S45 is performed.

Note that in another example embodiment, upon transition to the second television operation state, inputs to the television 2 may be switched (so that a television broadcast is displayed). Specifically, in the case where the television 2 can be switched between a first mode in which images inputted from the game apparatus 3 are displayed and a second mode in which television broadcast images are displayed, the CPU 10 may control the television 2 to switch to the second mode in response to the terminal device 7 displaying a sub-operation image (more specifically, the remote control image). Concretely, in step S44, the CPU 10 may control input switching of the television 2 so that the television 2 is set to the second mode in which a television broadcast is displayed. As a result, upon transition to the second television operation state, the user does not perform any operation to switch between inputs to the television 2, resulting in more simplified user operations. Note that input switching control may be performed by either the first or second method described in conjunction with step S24.

In step S45, the CPU 10 determines whether or not any control instruction has been provided. The control instruction is an instruction to control the television 2. The operation to provide the control instruction may be arbitrary. In the present example embodiment, as in step S23, the control instruction is provided by an operation of touching any one of the buttons 161 to 166 displayed on the terminal device 7 and representing control instructions. Specifically, the CPU 10 reads the touch data in the terminal operation data 104 from the main memory, and determines whether or not any one of the buttons 161 to 166 displayed on the terminal device 7 has been touched, on the basis of the touch data. When the result of the determination of step S45 is affirmative, the process of step S46 is performed. On the other hand, when the result of the determination of step S45 is negative, the process of step S46 is skipped, and the process of step S47 is performed.

In step S46, the CPU 10 controls the television 2 in accordance with the control instruction. The process of step S46 is the same as the process of step S24. Specifically, the CPU 10 controls the television 2 by the first method in which the game apparatus 3 outputs a control signal to the television 2 via the terminal device 7 and/or the second method in which the game apparatus 3 outputs a control signal directly to the television 2. Following step S46, the process of step S47 is performed.

In step S47, the CPU 10 determines whether or not to display a setting image. Specifically, the CPU 10 determines whether or not any operation has been performed to transition from the second television operation state to the setting state.

This operation may be performed in any arbitrary manner, and in the present example embodiment, it is an operation of touching the back button 167 displayed on the terminal device 7. Specifically, the CPU 10 reads the touch data in the terminal operation data 104 from the main memory, and determines whether or not the back button 167 displayed on the terminal device 7 has been touched, on the basis of the touch data. When the result of the determination of step S47 is affirmative, the process of step S48 is performed. On the other hand, when the result of the determination of step S47 is negative, the process of step S48 is skipped, and the process of step S49 is performed.

In step S48, the CPU 10 displays the setting image on the terminal device 7. The process of step S48 is the same as the process of step S41. The process of step S48 causes the game system 1 to transition from the second television operation state to the setting state. Following step S48, the process of step S49 is performed.

In step S49, the CPU 10 performs various setting processing. Specifically, the CPU 10 determines whether or not the terminal setting button 155, the controller setting button 156, the list button 157, or the manual button 158 has been selected (touched). If any one of the buttons has been selected, processing corresponding to the selected button is executed. The setting processing in step S49 may be similar to setting processing as executed in conventional and general game systems. Following step S49, the process of step S50 is performed.

In step S50, the CPU 10 determines whether or not to transition to the menu state. Specifically, it is determined whether or not to terminate or suspend the application whose execution is interrupted. This determination is as to whether or not any operation has been performed to terminate or suspend the application (i.e., the operation causing a transition from the interrupted state to the menu state). This operation may be performed in any arbitrary manner, and in the present example embodiment, it is an operation of touching the app end button 151 or the app suspension button 152 displayed on the terminal device 7. Specifically, the CPU 10 reads the touch data in the terminal operation data 104 from the main memory, and determines whether or not the app end button 151 or the app suspension button 152 displayed on the terminal device 7 has been touched, on the basis of the touch data. When the result of the determination of step S50 is affirmative, the process of step S51 is performed. On the other hand, when the result of the determination of step S50 is negative, the process of step S52 is performed.

In step S51, the CPU 10 performs an application closing process. Concretely, application data to be saved is stored to the main memory as save data 111. Note that the save data 111 is stored to the flash memory 17 or a storage medium having the application stored therein, at an appropriate time. Moreover, when the app end button 151 is determined to have been selected in step S50, the application starts from a predetermined initial state at the next startup. On the other hand, when the app suspension button 152 is determined to have been selected in step S50, the application starts from the interruption-time state at the next startup (or at the resumption). Accordingly, the CPU 10 may have different data stored as save data 111 between the case where the app end button 151 is selected and the case where the app suspension button 152 is selected. Following step S51, the CPU 10 ends the interruption-time process. Thereafter, the game system 1 transitions from the interrupted state to the menu state. That is, the CPU 10 performs the menu process (FIG. 16).

As described above, in the present example embodiment, when a predetermined operation (interruption operation) is performed on the terminal device 7 during the execution of an application, the CPU 10 generates a sub-operation image including a termination instruction image (app end button 151) which represents an instruction to terminate the application being executed (step S41). Thereafter, when an instruction is provided to terminate the application by selecting the terminate instruction image, the execution of the application is terminated (step S50). Furthermore, when the execution of the application is terminated, the CPU 10 generates a main operation image. In this manner, in the present example embodiment, when the application being executed is terminated, the terminal device 7 displays a main operation image (more specifically, an app selection image). Thus, after terminating an application, the user can readily select the next application to be executed.

Note that, in the present example embodiment, when an application is terminated in the app interruption process, the game system 1 transitions to the menu state. In another example embodiment, the game system 1 may transition to the first television operation state or the browser state in the same situation. For example, in response to a predetermined operation being performed in the interrupted state, the game system 1 may be able to transition to the first television operation state or the browser state. Concretely, the CPU 10 may display the television icon 125 and/or the browser icon 126 both in the setting image and the remote control image. Thereafter, when an operation is performed to select the television icon 125, the CPU 10 terminates the application and displays a device control image on the terminal device 7. As a result, the game system 1 transitions to the first television operation state. Alternatively, when an operation is performed to select the browser icon 126, the CPU 10 terminates the application and displays a browser image on the terminal device 7. As a result, the game system 1 transitions to the browser state. In this manner, the user can allow the game system 1 to transition from the interrupted state to a desired one of the three initial states. In addition, for example, when the application is terminated, the CPU 10 may determine one of the three states to which a transition is to be made, in accordance with a predetermined condition. Concretely, the CPU 10 may set the state to which a transition is to be made as the initial state.

In step S52, the CPU 10 determines whether or not to resume the application whose execution is interrupted. Specifically, the CPU 10 determines whether or not any operation has been performed to resume the application (i.e., to cause a transition from the interrupted state to the app execution state). This operation may be performed in any arbitrary manner, and in the present example embodiment, it is an operation of touching the app resumption button 153 displayed on the terminal device 7. Specifically, the CPU 10 reads the touch data in the terminal operation data 104 from the main memory, and determines whether or not the app resumption button 153 displayed on the terminal device 7 has been touched, on the basis of the touch data. When the result of the determination of step S52 is affirmative, the CPU 10 ends the interruption-time process, and performs the app execution process. As a result, the execution of the application is resumed, and the game system 1 transitions from the interrupted state to the app execution state. On the other hand, when the result of the determination of step S52 is negative, the process of step S42 is performed again. Thereafter, until the result of the determination of step S50 or S52 turns out to be affirmative, the interruption-time process is repeatedly performed.

In another example embodiment, upon transition from the second television operation state to the app execution state, inputs to the television 2 may be switched (such that images from the game apparatus 3 are displayed). Specifically, when the television 2 can be switched between the first mode in which images inputted from the game apparatus 3 are displayed and the second mode in which television broadcast images are displayed, the CPU 10 may control the television 2 to be switched to the first mode, in response to the image displayed on the terminal device 7 being switched from the remote control image to an image generated by executing an application. Concretely, when the result of the determination of step S52 is affirmative, the CPU 10 may perform input switching control such that the television 2 is brought into the first mode to display images from the game apparatus 3. As a result, upon transition from the second television operation state to the app execution state, the user does not perform any operation to switch between inputs to the television 2, resulting in more simplified user operations. Moreover, in another example embodiment, upon transition from the second television operation state to any of the setting image state, the menu state, and the browser state, the CPU 10 may perform the control as mentioned above. Note that the input switching control may be performed by either the first or second method described in conjunction with step S24.

As described above, in the present example embodiment, when a predetermined operation (interruption operation) is performed on the terminal device 7 during the execution of an application, the CPU 10 suspends the execution of the application. Moreover, in the state (interrupted state) where the terminal device 7 displays a sub-operation image, the CPU 10 determines whether or not any resumption instruction has been provided to resume the execution of the application (i.e., the operation of selecting the app resumption button 153 has been performed), on the basis of the terminal operation data. When there has been any resumption instruction, the CPU 10 resumes the execution of the application. In this manner, in the present example embodiment, when the execution of the application is interrupted, the user can readily resume the application by a resumption instruction.

As described above, in the present example embodiment, when a predetermined operation (interruption operation) is performed on the terminal device 7 during the execution of an application, the CPU 10 generates a predetermined sub-operation image. Thereafter, in the state (interrupted state) where the terminal device 7 displays the sub-operation image on the display section, it is determined whether or not any control instruction has been provided, on the basis of the terminal operation data (step S45). Accordingly, in the present example embodiment, when utilizing an application on the game system 1 using the terminal device 7, the user can operate the television 2 by interrupting the usage of the application. As a result, the user can operate the television 2 without ending the execution of the application, resulting in easier operations of switching between the state where the television 2 is used for the game system 1 and the state where the television 2 is used to display a television program. For example, using the terminal device 7 makes it easy for the user to temporarily interrupt the usage of the application and switch between inputs to the television 2 to view a television program, and also to temporarily interrupt television program viewing to use the application.

Furthermore, in the present example embodiment, the remote control image is also displayed in the browser state. Specifically, in the processing loop of steps S32 to S35 in the browser process (FIG. 20), the CPU 10 determines whether or not any operation has been performed to display the remote control image, concretely, the CPU 10 determines whether or not the operation of selecting (touching) the remote control display button 147 has been performed. When the result of the determination is affirmative, the same process as in step S44 is performed. Consequently, the terminal device 7 displays the remote control image. Note that the remote control image displayed in the browser state includes neither the app end button 151 nor the app suspension button 152. When the back button 167 is selected, the CPU 10 displays the browser image on the terminal device 7. In this manner, in the present example embodiment, the user can display the remote control image and operate the television 2 in the browser state as well.

Furthermore, in another example embodiment, a transition can be made from any of the three initial states to the state where sub-operation images (the setting image and the remote control image) can be displayed. Specifically, when a predetermined operation is performed in any of the three states, the CPU 10 may perform a process similar to the interruption-time process. Note that in this case, the app end button 151 and the app suspension button 152 are included neither in the setting image nor in the remote control image. Moreover, a button image representing an instruction to transition back to the original state is displayed in place of the app resumption button 153. Thus, the sub-operation image can be readily displayed in the initial state as well, so that the user can more readily operate the television 2 in the initial state.

Note that in another example embodiment, in addition to the remote control image being displayed on the terminal device 7, a program guide image may be displayed on the television 2 in the interrupted state. Specifically, when the terminal device 7 displays a sub-operation image, the CPU 10 may generate and output an image including a television program guide to the television 2. Note that the program guide image may be acquired from the external device 91 via the network 90, as in the television process. Moreover, the program guide may be displayed on the television 2 at any arbitrary time. For example, the program guide may be displayed on the television 2 at the start of the interruption-time process, at the time of the remote control image being displayed on the terminal device 7, or at the time of a predetermined display instruction being provided by the user.

(Operations to Shut Down the Game System 1)

In the present example embodiment, the user can shut down the game system 1 at any arbitrary time during the information processing (the initial process, the menu process, the television process, the browser process, the app execution process, and the interruption-time process). Specifically, when a predetermined shutdown operation is performed (e.g., the power button 54M of the terminal device 7 or the power button 24 of the game apparatus 3 is pressed), the CPU 10 performs a predetermined shutdown process, so that the game apparatus 3 and the terminal device 7 are powered off. Note that the shutdown process includes processing of storing data representing the state of the game system 1 (e.g., the menu state) at the time of shutdown to the flash memory 17. On the basis of that data, the initial state can be determined at the next boot.

With the information processing as described above, the user can use the game system 1 for various purposes, including, for example, program guide browsing, Web page browsing, and use of various applications. Moreover, by using the screen of the terminal device 7 as an operation screen, television 2 can be used for other purposes, including, for example, viewing a television program while using the game system 1, and therefore, the game system 1 and the television 2 can be used at the same time. As a result, the user can smoothly switch between the use of the game system 1 and the use of the television 2 (for a purpose other than in the game system 1). For example, the user can more smoothly enjoy using the game system 1 while watching a television program, or in turn can more smoothly enjoy watching a television program while using the game system 1. Moreover, both the game system 1 and the television 2 can be operated by the terminal device 7, which makes it possible to readily perform an operation to switch between the state where the game system 1 is used and the state where the television is used (for a purpose other than in the game system 1).

7. Variants

The above example embodiment is merely illustrative, and in another example embodiment, for example, the game system or suchlike can be carried out with, for example, a configuration as described below.

(Variant Related to the Initial State)

In the above example embodiment, the initial state includes three states which are different in terms of images to be displayed on the terminal device 7. Here, in another example embodiment, the number of state included in the initial states is not limited. Moreover, these states may or may not be different in terms of images to be displayed on the terminal device 7. For example, the states may be the same in terms of the images to be displayed on the terminal device 7 but may be different in terms of operations that can be performed.

(Variant Related to the Predetermined Display Device Used in the Game System 1)

In the above example embodiment, the predetermined display device used in the game system 1 has been described taking as an example the television 2 capable of receiving television broadcasting and displaying a television program. Here, the predetermined display device is not limited to the television 2, and may be any device having a plurality of input terminals and capable of image display. For example, the predetermined display device may be a display device used as a monitor of a personal computer (different from the game apparatus 3) or a monitor of a recorder/player.

(Variant Related to the Configuration of the Game System 1)

In the above example embodiment, the game system 1 is configured to include the game apparatus 3, the terminal device 7 provided with the display section (LCD 51), the controller 5, and the television 2. Here, the game system may be configured to include a game apparatus and an operating device, and may be capable of displaying images on a display section of the operating device and a predetermined display device. For example, the game system may be provided in a form not including the controller 5 or the predetermined display device (television 2).

Furthermore, the example embodiment has been described taking as an example the game system including a game apparatus capable of executing a game program, but another example embodiment may be an arbitrary information processing system and apparatus for use in executing any arbitrary application. Specifically, in the above example embodiment, the one or more applications executable by the game apparatus include a game application, but it is possible that no game application is included.

(Variant Related to the Information Processing Apparatus for Executing the Game Processing)

In the above example embodiment, a series of information processing tasks to be performed in the game system 1 is executed by the game apparatus 3, but the series of information processing tasks may be executed in part by another device. For example, in another example embodiment, a part (e.g., the terminal image generation process or the application execution process) of the series of information processing tasks may be executed by the terminal device 7. Moreover, in another example embodiment, a series of information processing tasks in an input system including a plurality of information processing apparatuses capable of communicating with each other may be shared between the information processing apparatuses. Specifically, the game system includes a game apparatus and an operating device, and may also include (a) an acquisition section for acquiring operation data representing an operation on the operating device, (b) a first operation image generation section for generating a predetermined first operation image to be displayed on a display unit in an initial state after boot of the game apparatus, (c) an operation image output section for outputting the first operation image to the operating device, (d) an instruction determination section for making determinations in the initial state on the basis of the operation data, the determinations being as to whether or not a selection instruction has been provided to select an application from among one or more applications, including a game application, which are executable by the game apparatus, and whether or not a control instruction has been provided to control a predetermined display device different from the operating device, (e) an application execution section for, when the selection instruction is determined to have been provided, executing the selected application, and outputting an image generated by the execution of the application to either the operating device or the predetermined display device, or both, and (f) a device control section for, when the control instruction is determined to have been provided, controlling the predetermined display device in accordance with the control instruction. In this case, one or more devices may include the sections (a) to (f).

Note that in the case where the aforementioned information processing is shared between information processing apparatuses, when processing is synchronized between the information processing apparatuses, the information processing becomes complicated. On the other hand, in the case where, as in the above example embodiment, information processing is executed by one game apparatus 3, and the terminal device 7 performs processes of receiving and displaying images (i.e., the terminal device 7 functions as a thin-client terminal), the information processing is not synchronized between information processing apparatuses, resulting in simplified information processing.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the above example embodiment can be applied to, for example, a game system, a game apparatus, and an information processing program for the purpose of, for example, allowing a display device, such as a television, to be readily operated during the execution of an application in the game system.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a first information processing device and a second information processing device, wherein
    the first information processing device includes:
        a first communication interface configured for communication with the second information processing device; and
        a first processing system, including at least one processor, for executing an application based on first operation data representing an operation performed on the first information processing device and second operation data received from the second information processing device using the first communication interface, and displaying an image generated by execution of the application on a predetermined display device different from the second information processing device,
    the second information processing device includes:
        a second communication interface configured for communication with the first information processing device;
        a second processing system, including at least one processor, for executing an application based at least on the second operation data representing an operation performed on the second information processing device; and
        a display for displaying an image generated by execution of the application, and
    if a predetermined operation is performed on the second information processing device while the application is executed on the second information processing device, the second processing system generates an operation image and displays the operation image on the display, and if a control instruction is provided while the operation image is displayed on the display, the second processing system controls the predetermined display device according to the control instruction.

2. The information processing system according to claim 1, wherein
    in a state where the operation image is displayed on the display, the second processing system determines whether or not a termination instruction has been provided to terminate the application being executed, and
    when the termination instruction is determined to have been provided, the second processing system terminates the execution of the application.

3. The information processing system according to claim 1, wherein
    when a predetermined operation is performed on the second information processing device during the execution of the application, the second processing system suspends the execution of the application,
    in the state where the operation image is displayed on the display, the second processing system determines whether or not a resumption instruction has been provided to resume the execution of the application, and
    when the resumption instruction is determined to have been provided, the second processing system resumes the execution of the application.

4. The information processing system according to claim 1, wherein
    the predetermined display device is configured to receive television broadcasting and display a television program, and
    when the operation image is displayed on the display, the first processing system generates an image including a television program guide and outputs the generated image to the predetermined display device.

5. The information processing system according to claim 1, wherein
    the second processing system generates as the operation image an image including a control instruction image representing the control instruction, and
    when the control instruction image is selected, the second processing system determines the control instruction to have been provided.

6. The information processing system according to claim 1, wherein
    the predetermined display device is configured to receive television broadcasting and display a television program, and
    the second processing system generates an image including a television program guide as the operation image, and outputs the generated image to the display.

7. The information processing system according to claim 1, wherein
    the predetermined display device is configured to receive television broadcasting and display a television program,
    the predetermined display device is switchable between a first mode in which an image is inputted from the first information processing device is displayed and a second mode in which a television broadcast image is displayed, and
    the second processing system controls the predetermined display device to be switched to the second mode in response to the operation image being displayed on the display.

8. The information processing system according to claim 1, wherein
    the predetermined display device is configured to receive television broadcasting and display a television program, the predetermined display device is switchable between a first mode in which an image inputted from the first information processing device is displayed and a second mode in which a television broadcast image is displayed, and the second processing system controls the predetermined display device to be switched to the first mode in response to the image displayed on the display switching from the operation image to an image generated by execution of the application.

9. The information processing system according to claim 1, wherein the second information processing device further includes a control signal transmitter for transmitting a control signal to control the predetermined display device, and the second processing system causes the control signal transmitter to transmit a control signal indicating the content of control according to the control instruction.

10. The information processing system according to claim 9, wherein the control signal transmitter transmits an infrared signal as the control signal, and the predetermined display device includes an infrared light receiver for receiving the infrared signal.

11. The information processing system according to claim 1, wherein the second information processing device further includes a touch panel provided on a screen of the display, the second processing system generates as the operation image an image including a control instruction image representing the control instruction, and when the control instruction image is selected on the touch panel, the second processing system determines the control instruction to have been provided.

12. The information processing system according to claim 1, wherein the control instruction is at least one of (a) an instruction to tune to a channel, (b) an instruction to turn on or off a power supply, (c) an instruction to change a sound volume, and (d) an instruction to change an input.

13. A game system comprising a game apparatus and a terminal device, wherein the game apparatus includes:
 a first communication interface configured for communication with the terminal device; and
 a first processing system, including at least one processor, for executing a game application based on first operation data representing an operation performed on the game apparatus and second operation data received from the terminal device using the first communication interface, and generating a game image by execution of the application, the terminal device includes:
 a second communication interface configured for communication with the game apparatus;
 a second processing system, including at least one processor, for executing a game application based at least on second operation data representing an operation performed on the terminal device; and
 a display for displaying the game image generated by execution of the game application, wherein if a predetermined operation is performed on the terminal device while the game application is executed on the terminal device, the second processing system generates an operation image and displays the operation image on the display, and if a control instruction is provided while the operation image is displayed on the display, the second processing system controls a predetermined display device different from the terminal device according to the control instruction.

14. The game system according to claim 13, wherein in a state where the operation image is displayed on the display, the second processing system determines whether or not a termination instruction has been provided to terminate the game application being executed, and when the termination instruction is determined to have been provided, the second processing system terminates the execution of the game application.

15. The game system according to claim 13, wherein when a predetermined operation is performed on the terminal device during the execution of the game application, the second processing system suspends the execution of the game application, in the state where the operation image is displayed on the display, the second processing system determines whether or not a resumption instruction has been provided to resume the execution of the game application, and when the resumption instruction is determined to have been provided, the second processing system resumes the execution of the game application.

16. The game system according to claim 13, wherein the second processing system generates as the operation image an image including a control instruction image representing the control instruction, and when the control instruction image is selected, the second processing system determines the control instruction to have been provided.

17. The game system according to claim 13, wherein the predetermined display device is configured to receive television broadcasting and display a television program, and the second processing system generates an image including a television program guide as the operation image, and outputs the generated image to the terminal device.

18. The game system according to claim 13, wherein the terminal device further includes a control signal transmitter for transmitting a control signal to control the predetermined display device, and, the second processing system causes the control signal transmitter to transmit a control signal indicating the content of control according to the control instruction.

19. The game system according to claim 18, wherein the control signal transmitter transmits an infrared signal as the control signal, and the predetermined display device includes an infrared light receiver for receiving the infrared signal.

20. The game system according to claim 13, wherein the terminal device further includes a touch panel provided on a screen of the display, the second processing system generates as the operation image an image including a control instruction image representing the control instruction, when the control instruction image is selected on the touch panel, the second processing system determines the control instruction to have been provided.

21. The game system according to claim 13, wherein the control instruction is at least one of (a) an instruction to tune to a channel, (b) an instruction to turn on or off a power supply, (c) an instruction to change a sound volume, and (d) an instruction to change an input.

22. An information processing device configured for communication with another information processing device, wherein
the other information processing device executes an application based on first operation data representing an operation performed on the other information processing device and second operation data received from the information processing device, and displays an image generated by execution of the application on a predetermined display device different from the information processing device,
the information processing device includes:
a communication interface configured for communication with the other information processing device;
a processing system, including at least one processor, for executing an application based at least on second operation data representing an operation performed on the information processing device; and
a display for displaying the image generated by execution of the application, and
if a predetermined operation is performed on the information processing device while the application is executed on the information processing device, the processing system generates an operation image and displays the operation image on the display, and if a control instruction is provided while the operation image is displayed on the display, the processing system controls the predetermined display device according to the control instruction.

23. A non-transitory computer-readable storage medium having stored therein an information processing program to be executed by a computer of an information processing device configured for communication with another information processing device, wherein
the other information processing device executes an application based on first operation data representing an operation performed on the other information processing device and second operation data received from the information processing device, and displays an image generated by execution of the application on a predetermined display device different from the information processing device,
the information processing program causes the computer to:
transmit second operation data representing an operation performed on the information processing device to the other information processing device using a communication interface;
if a predetermined operation is performed on the information processing device during the execution of the application based at least on the second operation data representing an operation performed on the information processing device, generate an operation image and display the operation image on a display of the information processing device; and
if a control instruction is provided while the operation image is displayed on the display, control the predetermined display device according to the control instruction.

24. An information processing method for execution in an information processing system including a first information processing device and a second information processing device, wherein
the first information processing device:
receives second operation data representing an operation performed on the second information processing device using a communication interface;
executes an application, on a processing system including at least one processor, based on first operation data representing an operation performed on the first information processing device and the received second operation data; and
displays an image generated by execution of the application on a predetermined display device different from the second information processing device,
the second information processing device:
executes an application, on a processing system including at least one processor, based at least on second operation data representing an operation performed on the second information processing device;
displays an image generated by execution of the application on a display of the second information processing device;
if a predetermined operation is performed on the second information processing device while the application is executed on the second information processing device, generates an operation image and displays the operation image on the display; and
if a control instruction is provided while the operation image is displayed on the display, controls the predetermined display device according to the control instruction.

25. A terminal device configured for communication with a game apparatus, wherein
the game apparatus executes a game application based on first operation data representing an operation performed on the game apparatus and second operation data received from the terminal device using a communication interface, and generates a game image by execution of the game application,
the terminal device includes:
a second communication interface configured for communication with the game apparatus;
a processing system, including at least one processor, for executing a game application based at least on second operation data representing an operation performed on the terminal device; and
a display for displaying the game image generated by execution of the game application, wherein
if a predetermined operation is performed on the terminal device while the game application is executed on the terminal device, the processing system generates an operation image and displays the operation image on the display, and if a control instruction is provided while the operation image is displayed on the display, the processing system controls a predetermined display device different from the terminal device according to the control instruction.

26. A non-transitory computer-readable storage medium having stored therein an information processing program to be executed by a computer of a terminal device configured for communication with a game apparatus, wherein
the game apparatus executes a game application based on first operation data representing an operation performed on the game apparatus and second operation data received from the terminal device using a communication interface, and generates a game image by execution of the game application,
the information processing program causes the computer to:
transmit second operation data representing an operation performed on the terminal device to the game apparatus using a communication interface;

if a predetermined operation is performed on the terminal device during the execution of the game application on the terminal device based at least on the second operation data representing an operation performed on the terminal device, generate an operation image and display the operation image on a display of the terminal device; and if a control instruction is provided while the operation image is displayed on the display, control a predetermined display device different from the terminal device according to the control instruction.

27. An information processing method for execution in a game system including a game apparatus and a terminal device, wherein the game apparatus:
receives second operation data representing an operation performed on the terminal device using a communication interface; and executes a game application, on a processing system including at least one processor, based on first operation data representing an operation performed on the game apparatus and the second operation data received from the terminal device, and generates a game image by execution of the application, the terminal device:
executes a game application, on a processing system including at least one processor, based at least on second operation data representing an operation performed on the terminal device;

displays a game image generated by execution of the game application on a display of the terminal device;

if a predetermined operation is performed on the terminal device while the game application is executed on the terminal device, generates an operation image and displays the operation image on the display; and if a control instruction is provided while the operation image is displayed on the display, controls a predetermined display device different from the terminal device according to the control instruction.

* * * * *